US012704018B2

(12) United States Patent
Schmiedeknecht

(10) Patent No.: US 12,704,018 B2
(45) Date of Patent: Aug. 11, 2026

(54) PARRALLEL SLIDING SYSTEMS

(71) Applicant: Salamander Industrie-Produkte GmbH, Tuerkheim (DE)

(72) Inventor: Till Schmiedeknecht, Munich (DE)

(73) Assignee: Salamander Industrie-Produkte GmbH, Türkheim (DE)

( * ) Notice: Subject to any disclaimer, the term of this patent is extended or adjusted under 35 U.S.C. 154(b) by 163 days.

(21) Appl. No.: 18/351,173

(22) Filed: Jul. 12, 2023

(65) Prior Publication Data

US 2024/0018825 A1 Jan. 18, 2024

(30) Foreign Application Priority Data

Jul. 12, 2022 (DE) ......................... 102022117356.9

(51) Int. Cl.
*E06B 7/205* (2006.01)
*E06B 3/46* (2006.01)

(52) U.S. Cl.
CPC ............ *E06B 7/205* (2013.01); *E06B 3/4609* (2013.01)

(58) Field of Classification Search
CPC ......... E05D 15/1013; E06B 7/20; E06B 7/21; E06B 2007/202; E06B 7/205
See application file for complete search history.

(56) References Cited

U.S. PATENT DOCUMENTS 724,138 A * 3/1903 Smith ........................ E06B 7/20 49/306
2012/0023825 A1 2/2012 Labrecque
2015/0052819 A1* 2/2015 Lee ..................... E05D 15/0621 49/420
2017/0260799 A1* 9/2017 Siller ........................ E06B 7/18

FOREIGN PATENT DOCUMENTS

| | | | | |
|---|---|---|---|---|
| AT | 501942 B1 | | 12/2006 | |
| CH | 648377 A5 | | 3/1985 | |
| DE | 10 2017 101 558 | * | 7/2018 | |
| KR | 10-1103152 | * | 1/2012 | |
| KR | 101103152 B1 | * | 1/2012 | |
| KR | 20-2013-0000368 | * | 1/2013 | |
| KR | 10-1245822 | * | 3/2013 | |
| KR | 101245822 B1 | * | 3/2013 | ............... E06B 7/16 |
| KR | 10-1270318 | * | 5/2013 | |

(Continued)

OTHER PUBLICATIONS

Apr. 27, 2023 (DE) Office Action—App. 102022117356.9.

*Primary Examiner* — Gregory J Strimbu
(74) *Attorney, Agent, or Firm* — Banner & Witcoff, Ltd.

(57) ABSTRACT

A parallel sliding system, in particular deposit-sliding system, may include a leaf, in particular a window or door leaf, which can be displaced horizontally from a closed position, in which the leaf closes an opening, in particular a window opening or door opening, into a sliding position, in which the leaf can slide parallel to the opening into an open position exposing the opening, and at least one slide which, when the leaf is displaced horizontally from the sliding position back into the closed position, is displaced relative to the leaf in the vertical direction in order to close in a sealing manner at least one gap between the leaf and a horizontal spar of a frame profile which surrounds a corresponding portion of the leaf in the closed position.

18 Claims, 13 Drawing Sheets

(56) References Cited

FOREIGN PATENT DOCUMENTS

Figure 1:
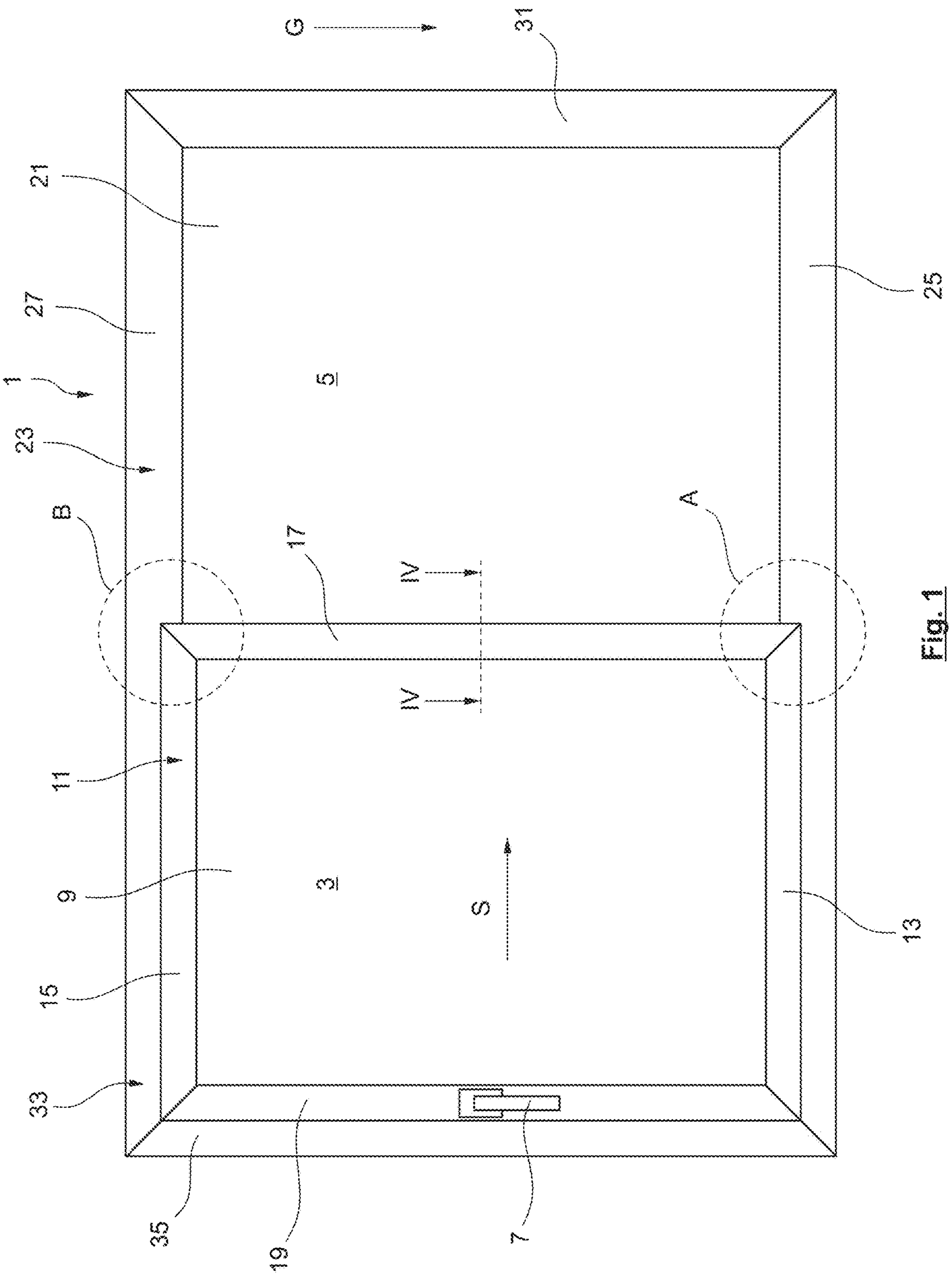

| | | | | | |
|---|---|---|---|---|---|
| KR | 101270318 | B1 | * | 5/2013 | |
| KR | 101426711 | B1 | * | 8/2014 | ............... E06B 7/16 |
| KR | 10-1468686 | | * | 12/2014 | |
| KR | 101468686 | B1 | * | 12/2014 | ............ E06B 3/263 |
| KR | 10-1510594 | | * | 4/2015 | |
| KR | 101510594 | B1 | * | 4/2015 | ............... E06B 7/16 |

* cited by examiner

PARRALLEL SLIDING SYSTEMS

CROSS REFERENCE TO RELATED APPLICATIONS

This patent application claims priority to German Patent Application No. 10 2022 117 356.9, filed Jul. 12, 2022, which is incorporated herein by reference in its entirety.

BACKGROUND

Field

The disclosure relates to a parallel sliding system, in particular a deposit-sliding-system.

Related Art

Parallel sliding systems are used in particular for windows and doors. These generally have a fixed glazing, in particular a fixed window glazing or a fixed door glazing, and a leaf, in particular a window leaf or door leaf, which can be moved from a closed position, in which the leaf closes an opening, in particular a window opening or door opening, into a slide position, in which the leaf can slide parallel to the opening into an open position exposing the opening. In the slide position, the leaves are usually guided in one or in two, in particular an upper and a lower, rail. Various systems are known for moving the leaf from the slide position to the closed position and vice versa.

One system is the parallel slide-tilt system (PST system). In this system, the leaf is first tilted from the closed position and then moved away from the opening by means of carriages and linkages. Another system is the parallel deposit-sliding-system (PDS system), in which the leaf is moved away from the opening into the slide position without a previous tilting movement, in parallel via carriages and linkages. The PST system and the PDS system have in common that in the closed position they are arranged essentially in the same planar plane as the fixed glazing. This has the advantage that the vertical spars of the leaf and the fixed glazing facing each other are arranged in a joint with each other in the closed position, so that along the facing end faces of the vertical spars there is a wide contact surface on which two seals can be arranged which surround the leaf in the sealed state (circumferential seals). Classically, one of the circumferential seals is used as an inner seal (sealing the leaf against the inside of the room) and one as an outer seal (sealing the leaf against the outside of the room). By using the two circumferential seals, parallel sliding systems can achieve a high degree of driving rain leak-tightness. In addition, the circumferential inner seal allows the notch region to be used for ventilation as well as drainage without the risk of water entering the notch region and/or cold air entering the interior.

A disadvantage of PST and PDS systems is that, because the leaf and fixed glazing are aligned in the closed position, they require a relatively large movement to move the leaf from the closed position to the slide position, usually between 60 mm and 80 mm. This makes the mechanisms required for this purpose larger, more complex, more expensive and, in particular, more prone to failure.

These problems are solved by lift-sliding-systems (LS-systems) and deposit-sliding-systems (DS-systems), in that the leaf and the fixed glazing are offset from each other even in the closed position, so that moving the leaf from the closed position to the slide position and vice versa requires only a movement of a few millimeters, usually between 5 mm and 7 mm. In LS-systems, the leaf is moved from the closed position to the slide position, in particular onto a carriage, by a vertical movement. In DS-systems, the displacement from the closed position to the slide position is affected by a horizontal movement, in particular a horizontal movement aligned orthogonally to the pane of the leaf (hereinafter also referred to as the deposit movement). Thanks to the relatively small deposit movement the mechanisms for moving the leaf from the closed position to the slide position and vice versa can be designed to be simpler, less expensive and, in particular, less prone to failure.

However, the offset arrangement of the leaf to the fixed glazing, even in the closed position, creates sealing challenges. The joint arrangement of the leaf and the fixed glazing in the closed position in PST and PDS systems results in overlap areas between the outer sides of the leaf and the fixed glazing and between the inner sides of the leaf and the fixed glazing, so that in the closed position a seal can be formed that surrounds the leaf on the inside, in particular an inner seal, and a seal that surrounds the leaf on the outside, in particular an outer seal. In contrast, in LS-systems and DS-systems, due to the offset arrangement of the leaf and fixed glazing, only one overlap area is available in the closed position, namely between the inner side of the fixed glazing and the outer side of the leaf. Therefore, known LS-systems and DS-systems have only one seal surrounding the leaf in the closed position. This is usually the outer seal. However, with only one circumferential seal, the previously described advantages of PST systems and PDS systems with regard to ventilation and drainage cannot be achieved.

Another problem that arises, particularly in deposit-sliding-systems (DS-systems), is that jogs are provided in the leaf profiles for the deposit movement, allowing horizontal deposit movement from the closed position to the slide position and vice versa. These jogs result in a gap between the leaf and the horizontal spars of a frame profile surrounding the leaf in the closed position. Since the leaves of AS systems perform a, in particular substantially, purely horizontal deposit movement, the gap between the leaf and the horizontal spar cannot be completely closed in the closed position. As a result, the notch region between the leaf and the frame profile is always in contact with the atmosphere of the inside of the room that is to be sealed off from the environment by the parallel sliding system. In systems that additionally use the notch region for ventilation and drainage, i.e., systems in which the notch region is not completely sealed off from the outside environment, this results in the interior being connected to the environment via the notch region even in the closed position, which can lead to water entry and heat loss.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1 a front view of a deposit-sliding-system according to one or more aspects of the disclosure.

Figure 2A:
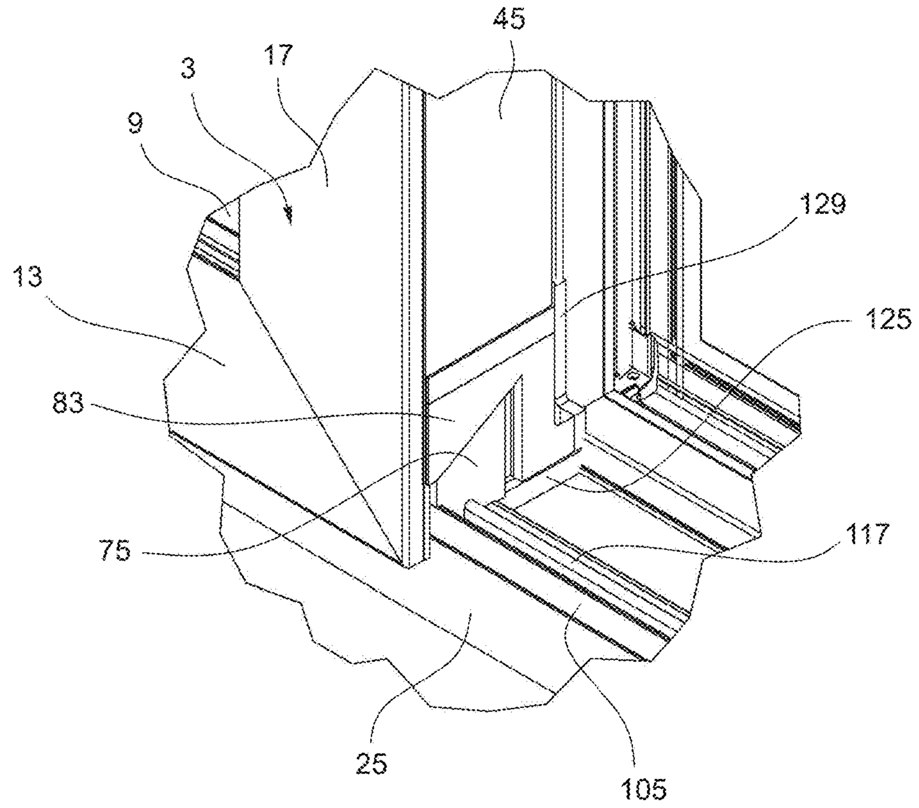

FIG. 2*a* a perspective view of the face side of the inner vertical spar of the leaf in the area of the lower horizontal spar of the frame profile according to the section A marked in FIG. 1.

Figure 2B:
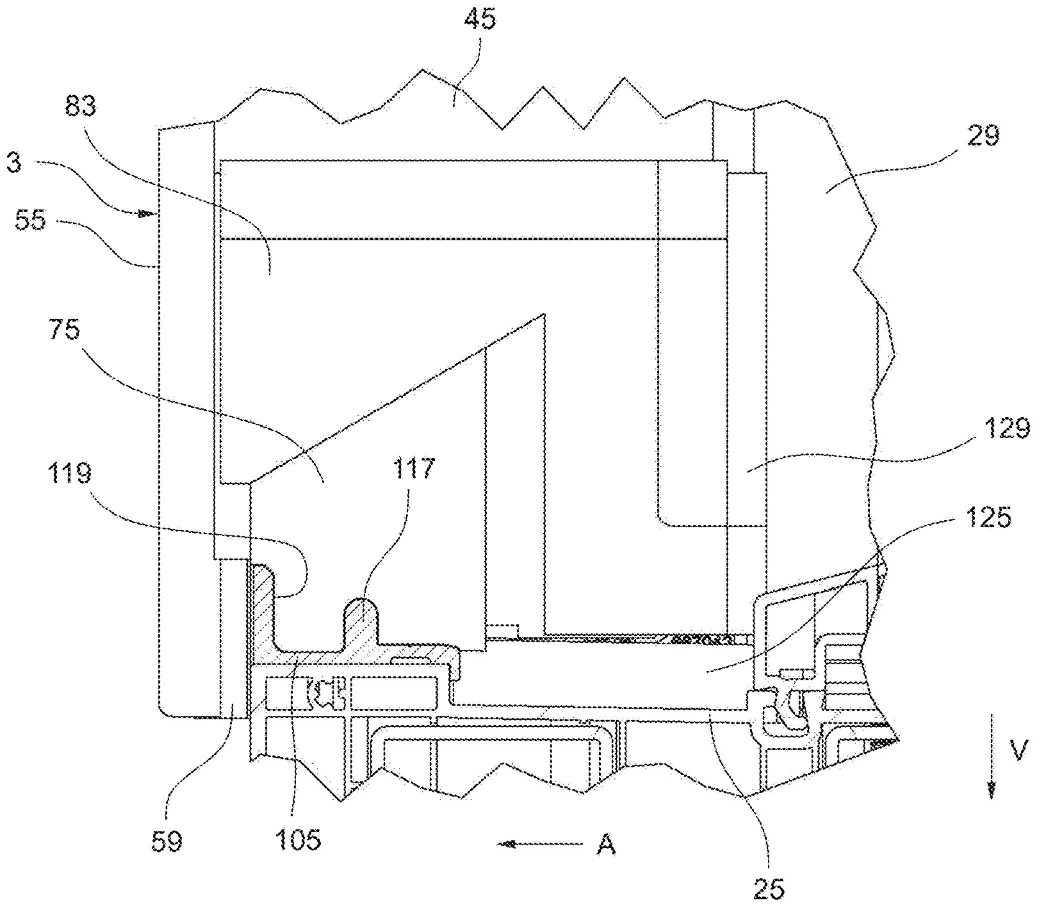

FIG. 2*b* a side view of area of the deposit-sliding-system shown in FIG. 2*a* with the leaf in the closed position according to one or more aspects of the disclosure.

Figure 2C:
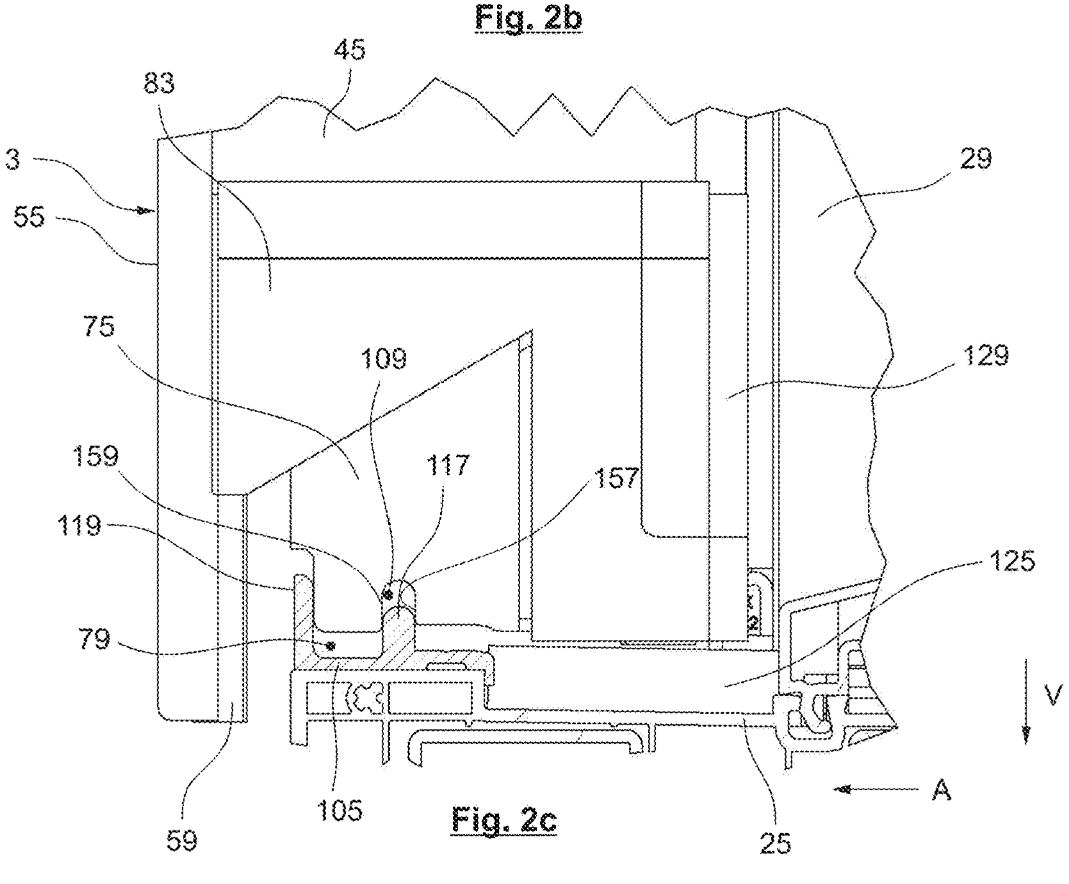

FIG. 2*c* the view shown in FIG. 2*b* with the leaf in the slide position according to one or more aspects of the disclosure.

Figure 3A:
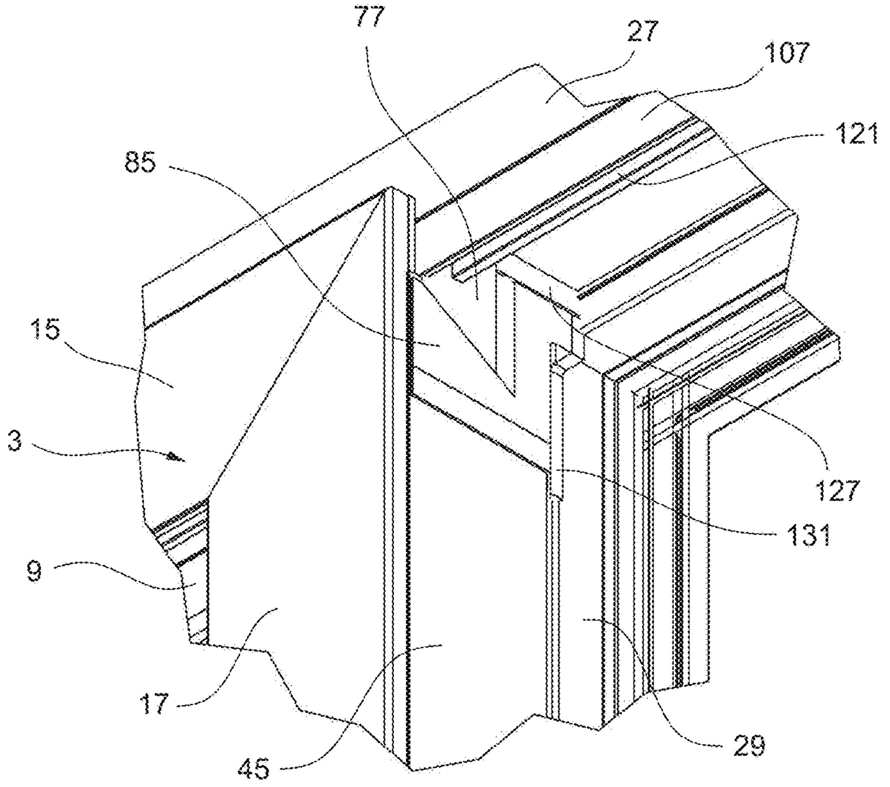

FIG. 3*a* a perspective view of the face side of the inner vertical spar of the leaf in the area of the upper horizontal spar of the frame profile according to the section B marked in FIG. 1.

Figure 3B:
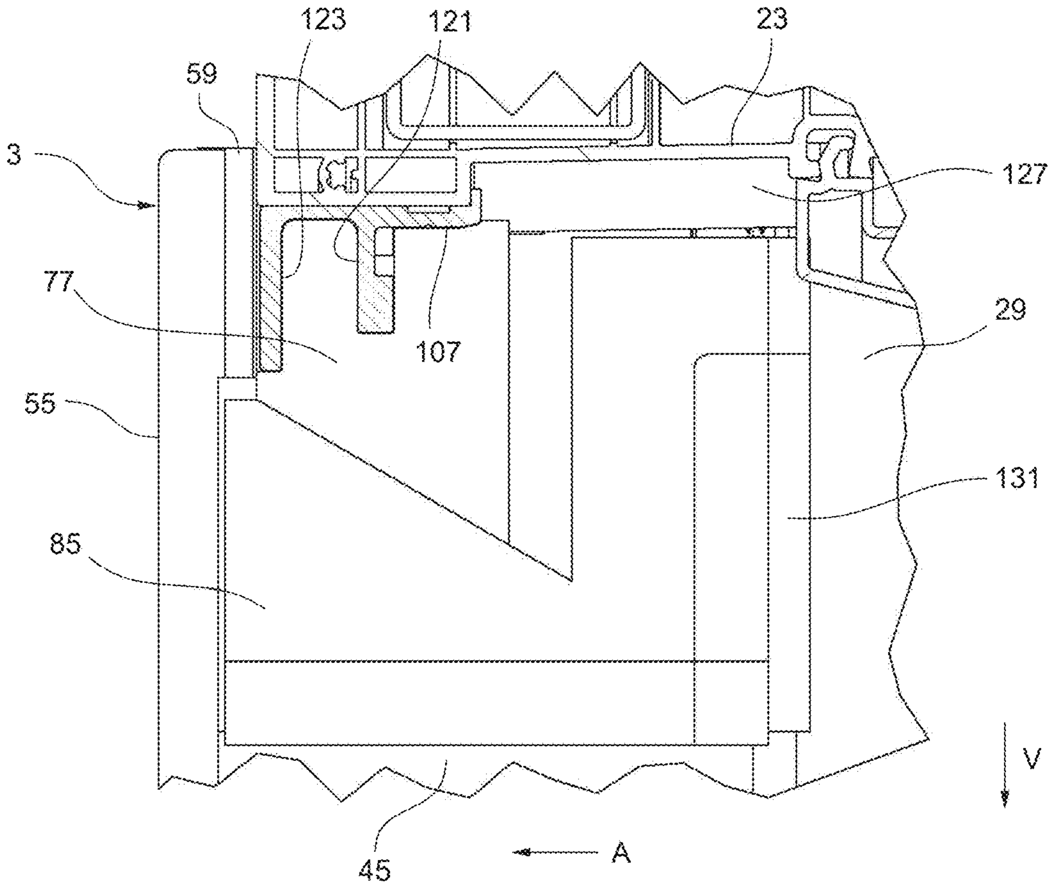

FIG. 3*b* a side view of the area of the deposit slide system shown in FIG. 3*a* with the leaf in the closed position.

Figure 3C:
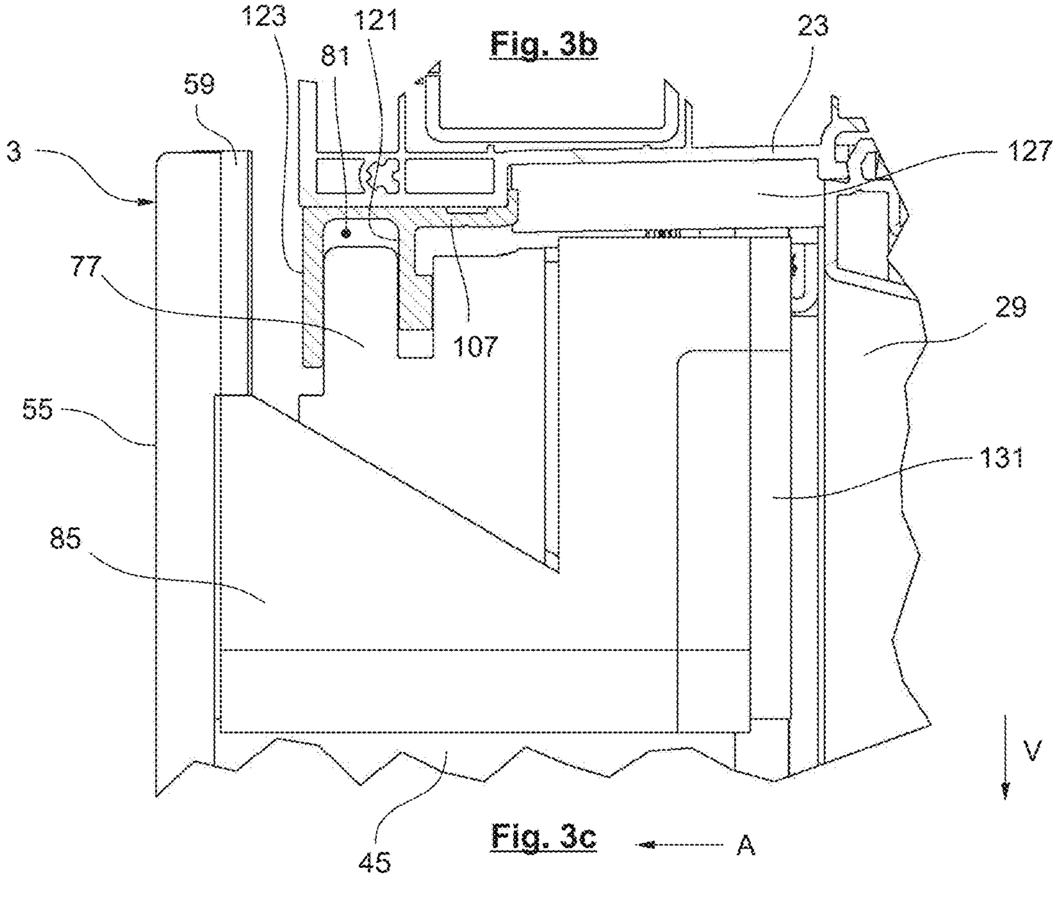

FIG. 3*c* the view shown in FIG. 3*b* with the leaf in the slide position according to one or more aspects of the disclosure.

Figure 4:
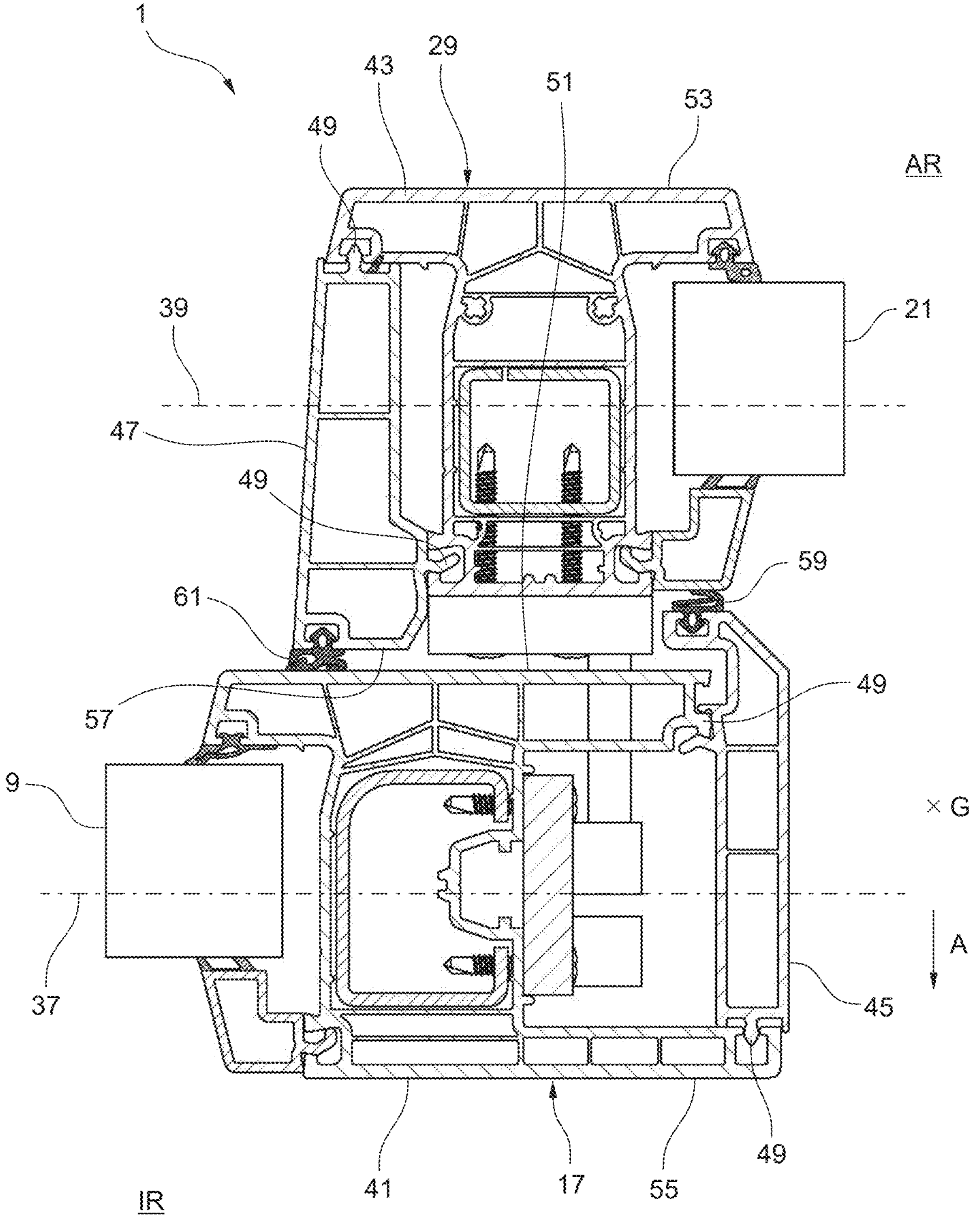

FIG. 4 a plan view of the leaf and fixed glazing in the area of cut plane C indicated in FIG. 1 according to one or more aspects of the disclosure.

Figure 5:
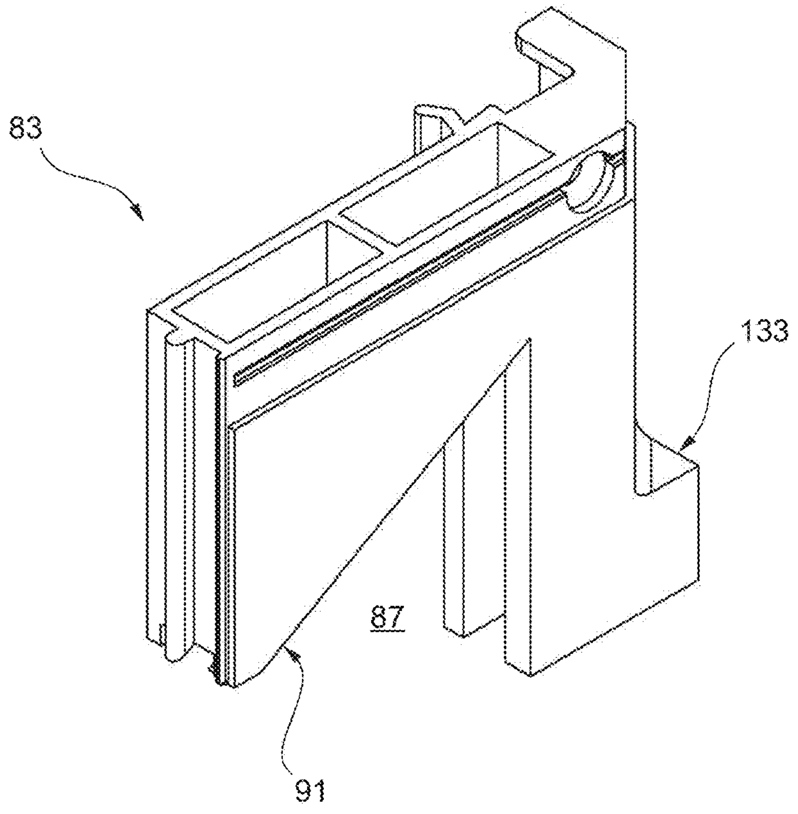

FIG. 5 a perspective view of the guide shown in FIGS. 2*a*-2*c* according to one or more aspects of the disclosure.

Figure 6:
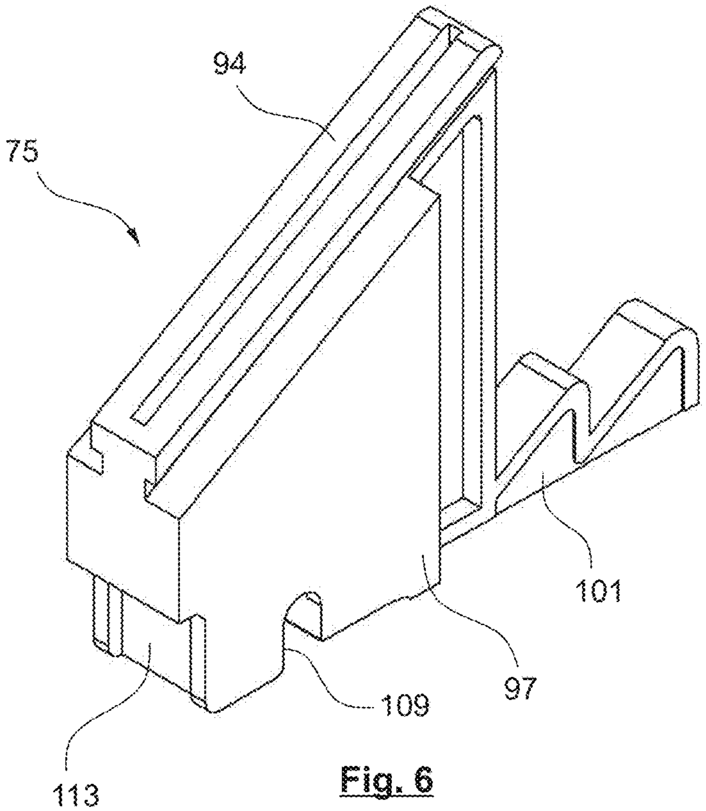

FIG. 6 a perspective view of the slide shown in FIGS. 2*a*-2*c* according to one or more aspects of the disclosure.

Figure 7:
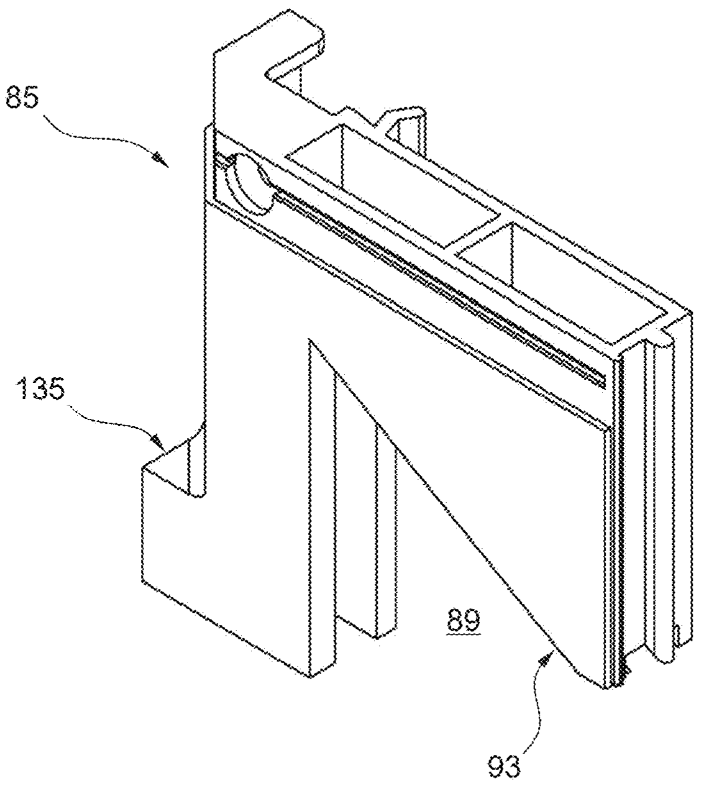

FIG. 7 a perspective view of the guide shown in FIGS. 3*a*-3*c* according to one or more aspects of the disclosure.

Figure 8:
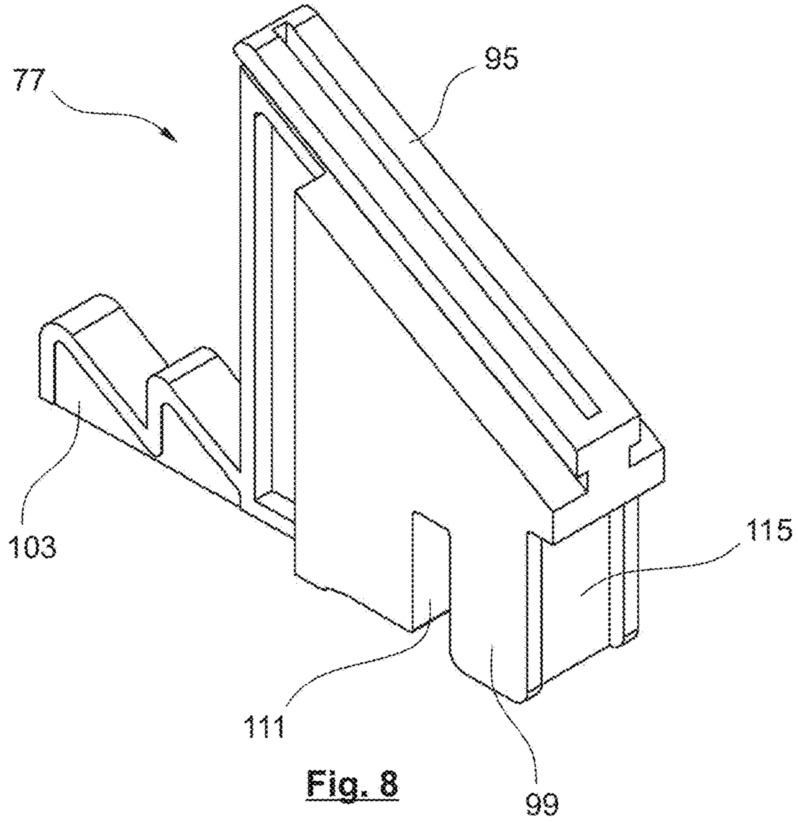

FIG. 8 a perspective view of the slide shown in FIGS. 3*a*-3*c* according to one or more aspects of the disclosure.

Figure 9:
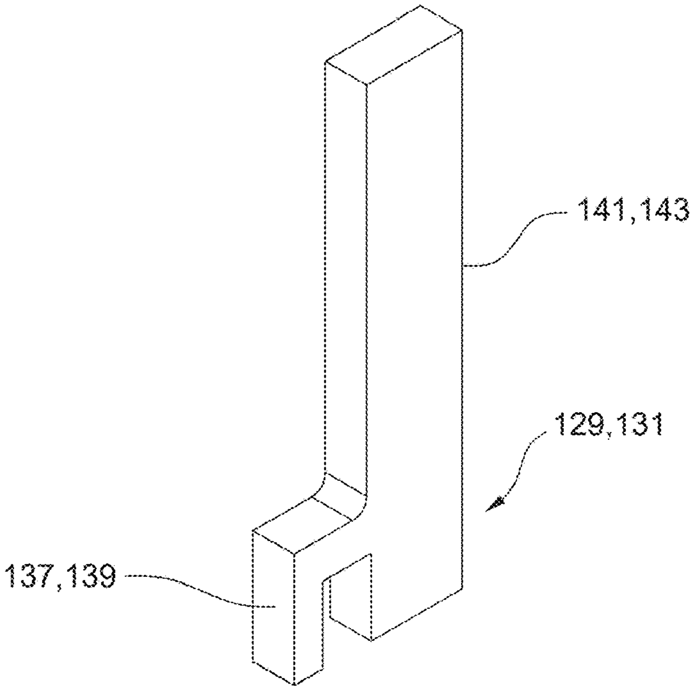

FIG. 9 a perspective view of a guide sealing means for sealing the guide to the vertical spar of the frame section according to one or more aspects of the disclosure.

Figure 10:
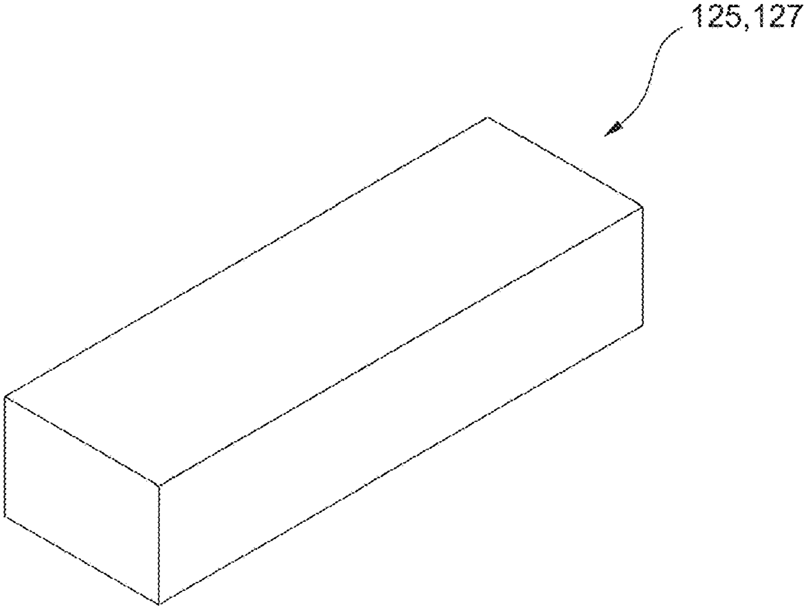

FIG. 10 a perspective view of a slide sealing means for sealing the slide against a horizontal member of the frame profile according to one or more aspects of the disclosure.

Figure 11A:
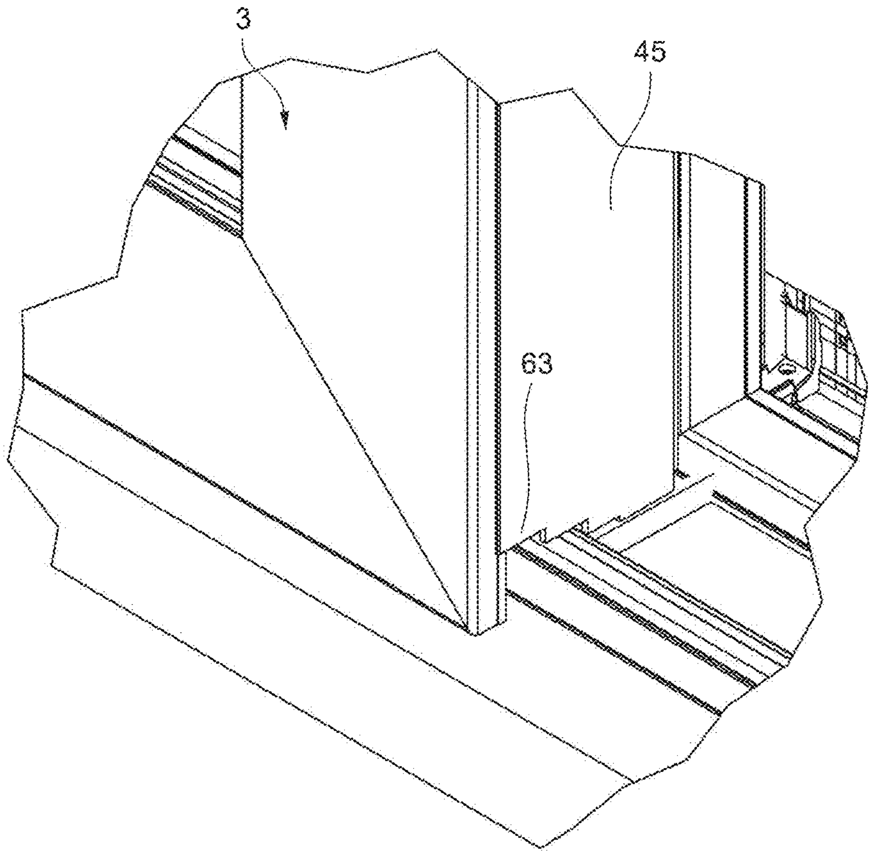
Fig. 11a (related art)

FIG. 11*a* a perspective view of the face side of the inner vertical spar of the leaf in the area of the lower horizontal spar of the frame profile according to the cutout A marked in FIG. 1 for conventional sliding systems.

Figure 11B:
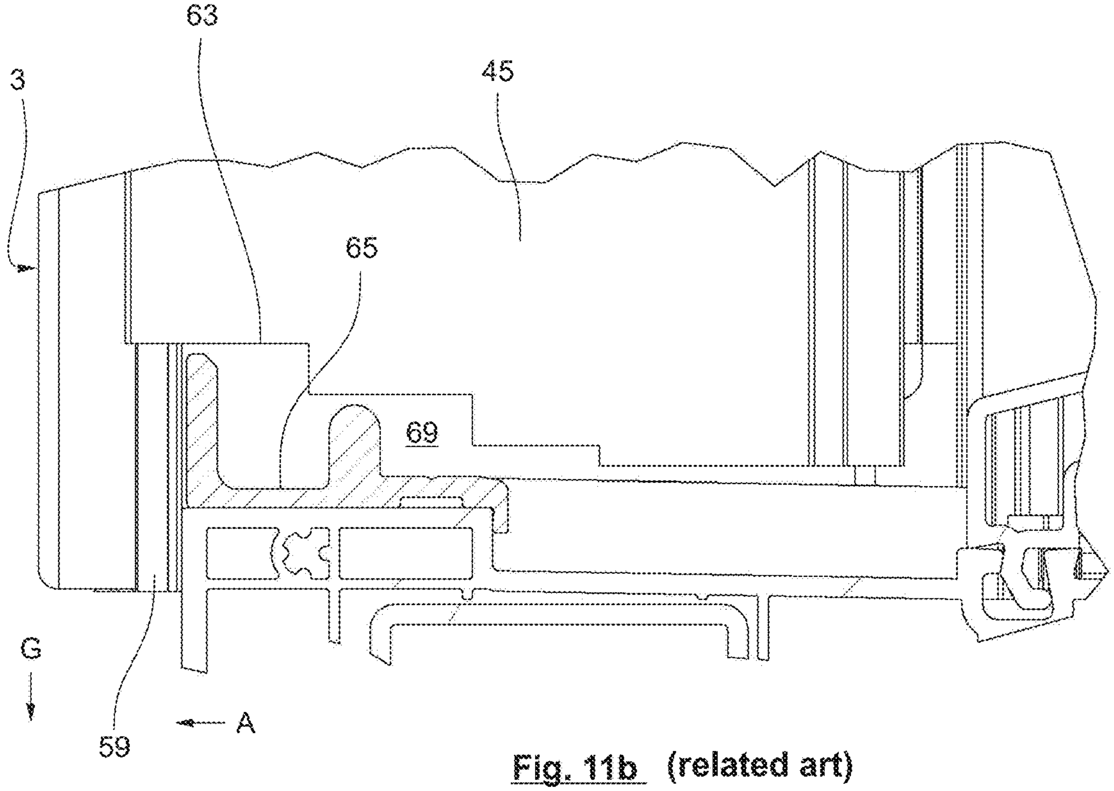
Fig. 11b (related art)

FIG. 11*b* a side view of the deposit-sliding-system area shown in FIG. 11*a*.

Figure 12A:
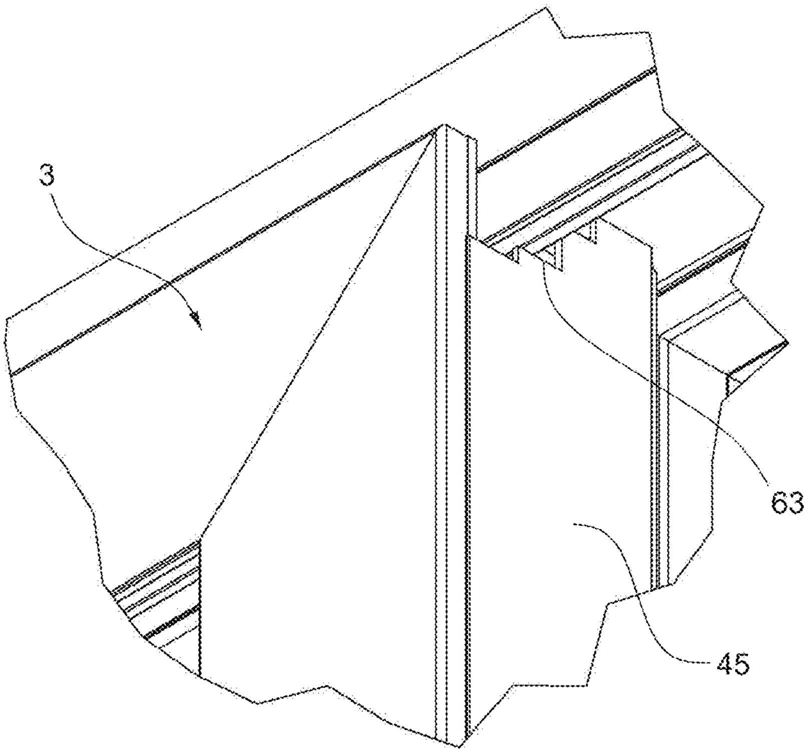
Fig. 12a (related art)

FIG. 12*a* a perspective view of the face side of the inner vertical spar of the leaf in the area of the upper horizontal spar of the frame profile according to the cut-out B marked in FIG. 1 for conventional sliding systems.

Figure 12B:
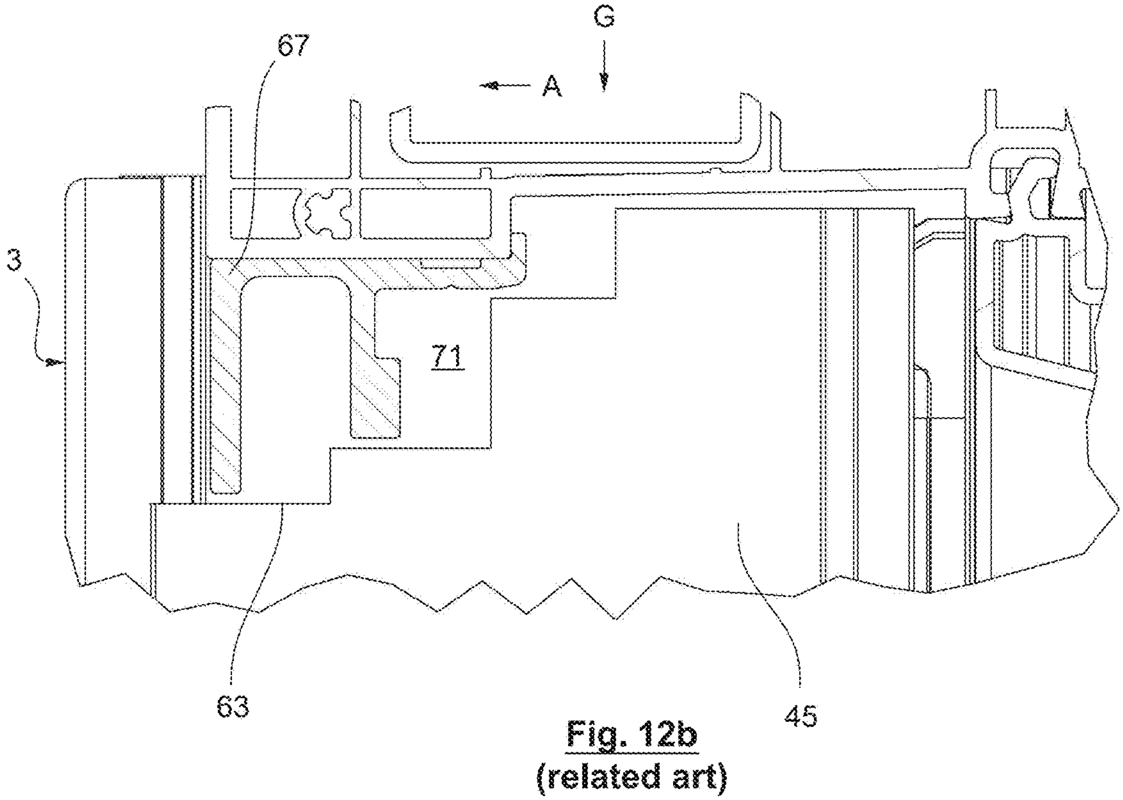
Fig. 12b (related art)

FIG. 12*b* a side view of the area of the deposit-sliding-system shown in FIG. 12*a*.

Figure 13:
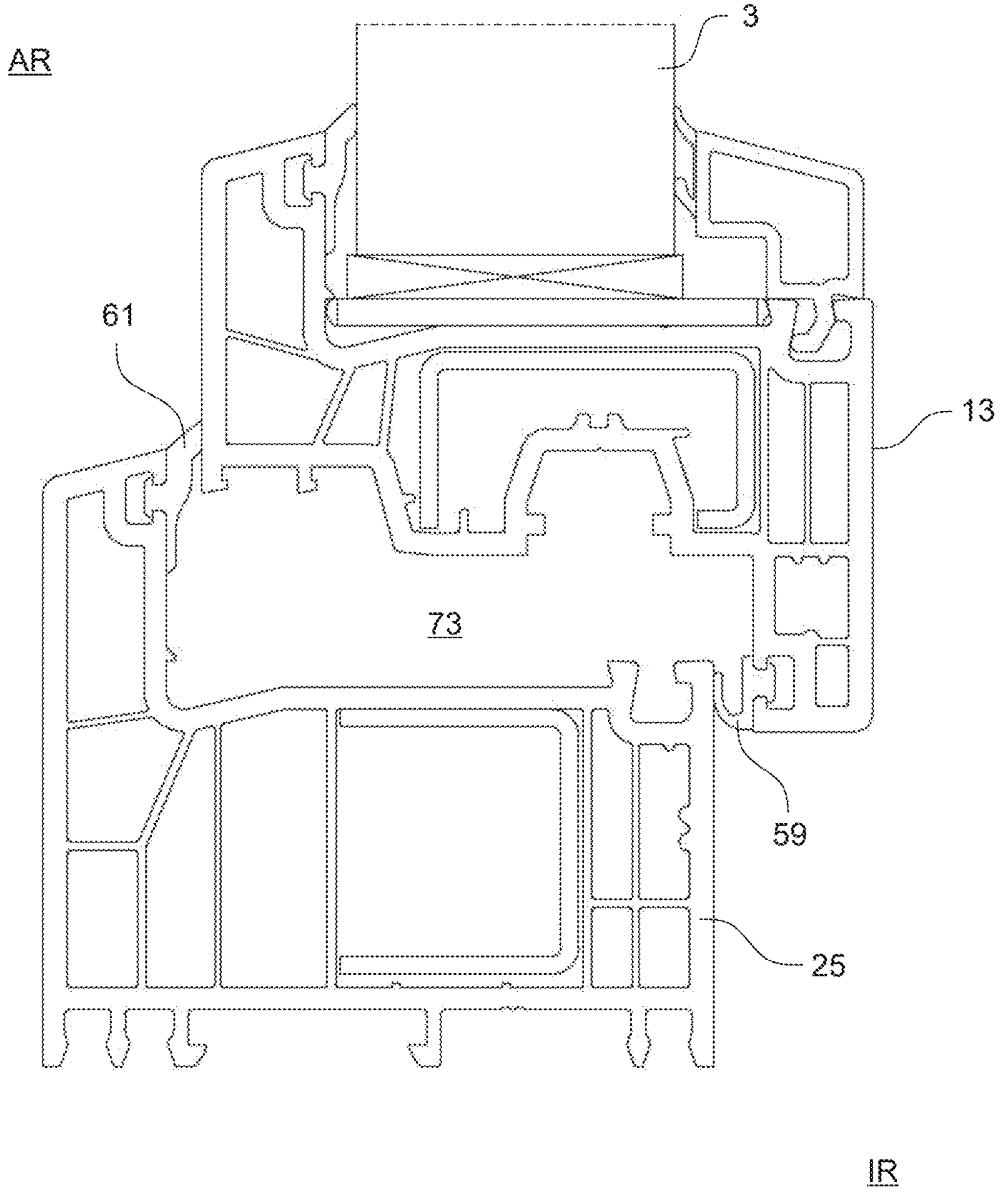

FIG. 13 a side view of a notch region between a leaf and a frame profile of a door system according to one or more aspects of the disclosure.

Figure 14:
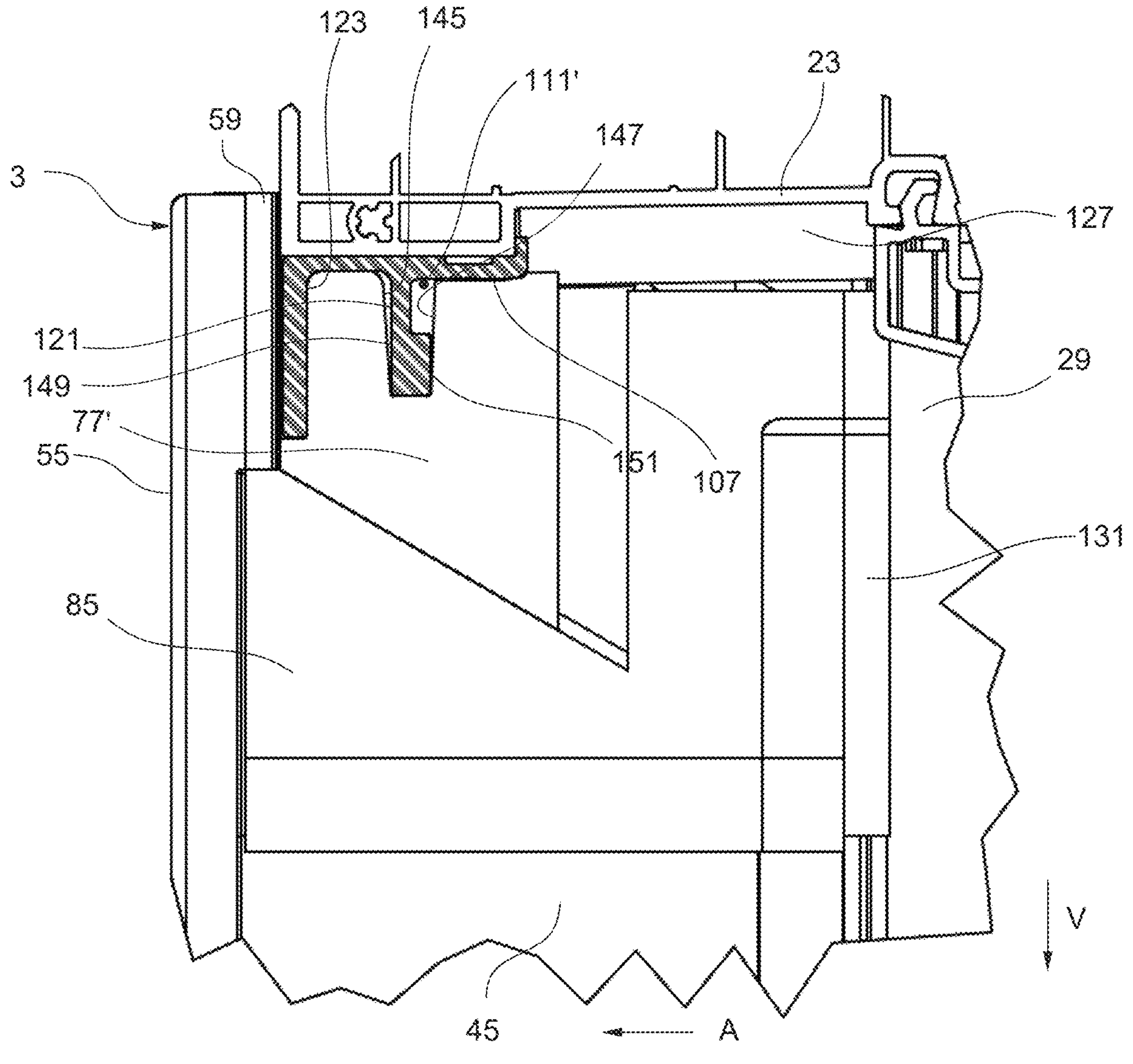

FIG. 14 a side view of the area of the deposit slide system shown in FIG. 3*a* with a modified slide compared to FIG. 3*b*, according to one or more aspects of the disclosure.

Figure 15:
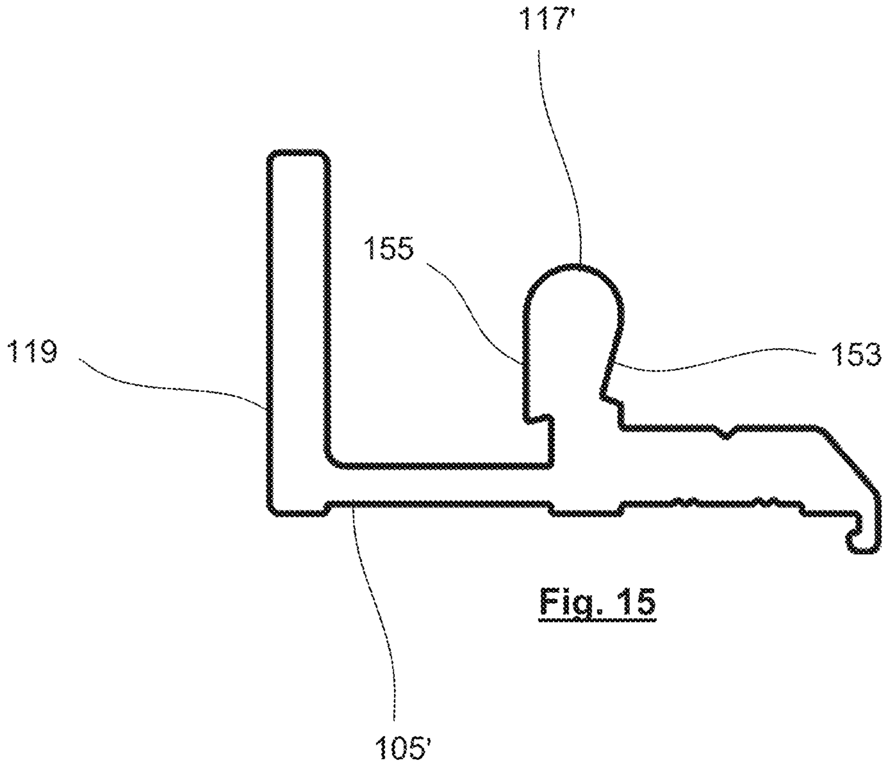

FIG. 15 a modified slide for use in the area of the lower horizontal spar of the frame section as shown in section A of FIG. 1, according to one or more aspects of the disclosure.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, and components have not been described in detail to avoid unnecessarily obscuring embodiments of the disclosure.

An object of the disclosure is to overcome the disadvantages of the prior art, in particular to provide a parallel sliding system, in particular a deposit-sliding-system, with which the leak-tightness of the system, especially the sealing of the inside of the room against the outside, is improved.

The disclosure relates to a parallel sliding system, in particular a deposit-sliding-system. The parallel sliding system may comprise a leaf, in particular a window or door leaf, which can be moved horizontally from a closed position, in which the leaf closes an opening, in particular a window opening or door opening, into a slide position, in which the leaf can be moved parallel to the opening into an open position exposing the opening. In an exemplary embodiment, the leaf comprises a pane, in particular a glass pane (hereinafter also referred to as glazing). Furthermore, the leaf has, in particular, a leaf profile surrounding the pane and having, in the vertical direction, an upper and a lower horizontal spar as well as an outer vertical spar facing the opening in the open position and an inner vertical spar facing away from the opening in the open position. In an exemplary embodiment, the parallel sliding system further comprises a fixed pane, in particular fixed glazing, preferably fixed window glazing or fixed door glazing. In an exemplary embodiment, the fixed pane comprises a pane, in particular a glass pane. The fixed pane preferably has a fixed pane profile surrounding the pane. The profile preferably has an upper and a lower horizontal spar in the vertical direction, as well as an outer vertical spar facing away from the leaf in the closed position and an inner vertical spar facing the leaf in the closed position. The outer and/or the inner vertical spar may have a support structure to which a cover profile is attached.

In an exemplary embodiment, the panes of the leaf and/or the fixed pane each extend in a main extension plane. In an exemplary embodiment, the respective main extension plane of the pane of the leaf and/or of the fixed pane is spanned by a vector aligned in the vertical direction and a vector aligned in the horizontal direction. In an exemplary embodiment, the vector aligned in the horizontal direction corresponds to a sliding direction in which the leaf can be displaced towards the open position. By the main extension plane it is meant the plane in which the pane extends. In an exemplary embodiment, the main extension plane is the plane that is arranged in the thickness direction of the pane centrally in the respective pane.

In an exemplary embodiment, the leaf is moved from the closed position to the slide position in the direction of the normal to its main extension plane. The normal to the main extension plane of the leaf can also be referred to as the deposit direction. In principle, the parallel sliding system according to the disclosure encompasses PST systems, PDS systems and deposit-sliding-systems (DS systems), as long as these provide a horizontal displacement of the leaf for displacing the leaf from the closed position to the slide position. In an exemplary embodiment, however, the disclosure relates to a deposit-sliding system. A deposit-sliding-system is characterized in particular by the fact that the leaf and the fixed pane, in particular the main extension plane of the leaf and od the fixed pane, are offset from each other in the closed position. In particular, in the closed position, the panes of the leaf and of the fixed pane are spaced apart from each other in the deposit direction. In particular, the distance between the panes in the deposit direction in the closed position is at least 5 mm, 10 mm, 15 mm, 20 mm, 25 mm, 30 mm, 35 mm, 40 mm, 45 mm, 50 mm, 55 mm or 60 mm. In an exemplary embodiment, the panes are spaced apart from each other in the closed position by sections of the inner vertical spars of the leaf and the fixed pane facing each other in the deposit direction. In an exemplary embodiment, the spars of the leaf frame and/or of the fixed pane frame each have an inner side facing the inner space and an outer side facing the outer space (environment). In an exemplary embodiment, the inner side and the outer side extend substantially parallel to the main extension plane of the respective pane. In this context, substantially encompasses in particular a deviation from a perfectly parallel extension of +/−25°, 20°, 15°, 10°, 5°, 3° or 1°. In an exemplary embodiment, each of the spars further comprises a face side extending in particular between the inner side and the outer side in the deposit direction. In addition to the deposit direction, the face dies of the spars preferably extend in the vertical direction for vertical spars and preferably extend in the horizontal direction for horizontal spars.

In an exemplary embodiment, the inner vertical spars of the pane and of the fixed pane overlap in the closed position in the sliding direction. In an exemplary embodiment, the inner vertical spars overlap in the sliding direction over at least 30%, 40%, 50%, 60%, 70% or 80% of one of the vertical spars, in particular of the larger vertical spar, in the sliding direction.

The offset arrangement of the leaf and fixed pane allows the leaf to be transferred from the closed position to the slide position by a relatively small movement in the deposit direction. In an exemplary embodiment, the deposit-sliding-system is designed to move the leaf from the closed position to the slide position by a deposit movement path of between 1 mm and 20 mm, preferably between 2 mm and 15 mm, more preferably between 3 mm and 10 mm, most preferably between 5 mm and 7 mm. In an exemplary embodiment, the deposit-sliding-system is designed so that the deposit movement takes place substantially exclusively in the horizontal direction, in particular in the deposit direction. By substantially in this context it is to be understood in particular that the amplitude described above takes place to at least 60%, 70%, 80%, 85%, 90%, 95%, 98%, 99% or 100% in the deposit direction, i.e. in the direction orthogonal to the main extension direction of the pane of the leaf.

In an exemplary embodiment, in the slide position, the leaf is displaceable orthogonal to the deposit direction. In particular, the leaf is displaceable in the slide position parallel to the main extension plane of the pane of the leaf and/or of the pane of the fixed pane.

According to one aspect of the disclosure, the parallel sliding system comprises at least one slide which is displaced in a vertical direction relative to the leaf when the leaf is displaced horizontally from the slide position back to the closed position in order to sealingly close at least one gap between the leaf and a horizontal spar of a frame profile surrounding the leaf in the closed position. In order to enable the leaf to be displaced from the closed position into the slide position, in particular in the deposit direction, a jog is provided in the horizontal spars of the leaf, in particular in the case of deposit-sliding-systems, which jog allows the leaf to move relative to the horizontal spars of the frame profile, in particular to rails arranged therein, which guide the leaf in the slide position. In known deposit-sliding-systems, however, this jog results in a gap remaining between the leaf and the horizontal spar of the frame profile even in the closed position. Since known deposit-sliding-systems perform a purely horizontal movement when the leaf is moved from the closed position to the slide position and back, this gap cannot be closed. As a result, two circumferential seals cannot be provided with known deposit-sliding-systems, since otherwise the inner seal is interrupted by the gap. By using a slide according to the disclosure, which is displaced in the horizontal direction relative to the leaf in the vertical direction when the leaf is displaced, this gap can be closed, whereby, as described in detail below, a second circumferential seal can be provided, in which an inner area of the inner seal is connected, in particular bridged, to an outer area of the inner seal by means of a bridging section.

In an exemplary embodiment, the parallel sliding system comprises a guide that is fixedly connected to the leaf and uses the horizontal movement of the leaf between the closed position and the slide position to move the slide in the vertical direction. In an exemplary embodiment, the at least one guide and the at least one slide perform a horizontal movement and a vertical movement relative to each other in response to a movement of the leaf between the closed position and the slide position. In an exemplary embodiment, the slide moves substantially exclusively in the vertical direction and the guide moves substantially exclusively in the horizontal direction. In this context, “substantially” is to be understood in particular as meaning that at least 70%, 80%, 90%, 95%, 98%, 99% or 100% of the movement amplitude of the leaf or of the guide is realized in the corresponding direction. In an exemplary embodiment, the guide has a receptacle for the slide, in which the slide is guided relative to the guide along a slide rail inclined relative to the horizontal. In an exemplary embodiment, the slide is positively guided in the slide rail, in particular by means of a dovetail or T-groove connection. In an exemplary embodiment, the slide rail is inclined by at least 20°, 30°, 35° or 40° relative to the horizontal, in particular in the direction of gravity. In an exemplary embodiment, the slide rail has a recess for receiving a guide lug, in particular in the form of a dovetail or T-shaped projection, of the slide.

In an exemplary embodiment, the slide has a slope formed complementary to the slide rail. In an exemplary embodiment, the slope is inclined at the same angle to the horizontal as the slide rail. In an exemplary embodiment, the slide rail and/or the slope of the slide extends, in the deposit direction, downwardly from a side of the recess facing the opening to a side of the recess facing away from the opening. Vertical sections preferably extending substantially in the vertical direction adjoin the respective ends of the slide rail/slope of the slide. In this context, “substantially” encompasses a deviation of up to 30°, 20°, 10°, 5°, 3° or 1° from the vertical.

The inclination of the slide rail relative to the horizontal forces the slide to move vertically upon a horizontal movement between the closed position and the slide position. In an exemplary embodiment, the slide and the guide are adapted to each other in such a way that the slide is moved in the vertical direction away from the respective horizontal spar of the frame profile, in other words toward the leaf, when moving from the closed position to the slide position, and is displaced in the opposite direction, in particular away from the leaf, toward the horizontal spar of the frame profile when moving the leaf from the slide position back to the closed position.

To ensure that the gap between the leaf and the horizontal spar of the frame profile is sealed in the closed position, the slide may be arranged in the closed position opposite a rail in which the leaf is guided in the slide position. In an exemplary embodiment, the slide is adapted to the contour of the rail in such a way that a gap existing between the slide and the rail in the slide position is sealed in the closed position. In an exemplary embodiment, the slide has at least one, preferably two, recesses for this purpose, which are designed to complement projections, in particular guide projections, of the guide rail. In particular, this allows the projections of the rail to enter the recesses of the slide in the closed position, so that the face sides of the slide and the rail can come into sealing contact with each other.

Alternatively, or additionally, the parallel sliding system has at least one guide sealing means arranged on a side of the slide facing the opening, via which the guide connects, in the closed position, in a sealing manner to a vertical spar of the frame profile. In an exemplary embodiment, in the closed position, the guide sealing means is arranged between the guide and the vertical spar of the frame profile. In particular, in the closed position, the guide sealing means is pushed, in particular pressed, by the guide against the vertical spar of the frame profile in order to provide a sealing contact between the guide and the vertical spar of the frame profile. In an exemplary embodiment, in the closed position, the guide sealing means is in sealing contact with the inner vertical spar of the fixed sliding profile. In the exemplary embodiment of the present disclosure, the inner vertical spar of the leaf is formed by the inner vertical spar of the fixed pane, in particular fixed glazing. However, in one or more other embodiments where there is no fixed pane, for example embodiments where the leaf is exclusively slidable relative to a wall, the vertical spar of the frame profile may also be formed by a frame profile which itself does not form the internal vertical spar of a fixed pane.

In an exemplary embodiment, the guide sealing means is connected to the guide, in particular by a material bond, preferably by means of an adhesive. In particular, the guide can have a guide sealing means receptacle in which the guide sealing means can be inserted. In particular, the guide sealing means may be L-shaped, wherein, in one of the sliding systems, a recess is provided, which recess divides the guide sealing means into a receiving section, in particular an L-shaped receiving section, and a sealing section, in particular an I-shaped sealing section, to which the L-shaped section in particular adjoins.

Furthermore, the parallel sliding system preferably has a slide sealing means arranged in a notch region of the horizontal spar, with which the slide is in sealing contact in the closed position in order to close the gap in the region of the vertical spar in a sealing manner in the closed position. In an exemplary embodiment, the slide sealing means is arranged in the horizontal direction, in particular in the deposit direction, next to the guide rail, in particular adjoining it. In particular, the slide sealing means is arranged in a receptacle recessed relative to the guide rail in the direction of gravity. In an exemplary embodiment, the slide sealing means has an angular, in particular quadrangular, preferably rectangular, cross-section. In an exemplary embodiment, the extension of the slide sealing means in the horizontal direction, in particular in the deposit direction, is greater, preferably at least twice, three times or four times as great as the vertical extension of the slide sealing means. In an exemplary embodiment, the slide sealing means is recessed relative to the guide rail in the horizontal spar of the frame profile in such a way that the face side of the slide sealing means facing the slide is essentially at the same height in the vertical direction as the face side of the rail facing the slide. Essentially, an offset between the face sides of up to 15 mm, 10 mm, 8 mm, 5 mm, 3 mm or 1 mm is preferably permissible. In an exemplary embodiment, the face side of the slide sealing means facing the slide projects beyond the face side of the rail by the previously defined range. In an exemplary embodiment, the slide is adapted to the geometry and the vertical extension of the slide sealing means and the rail in such a way that the slide is in sealing contact both with the guide rail and with the slide sealing means in the closed position of the leaf. For this purpose, the slide preferably has a slide body, which is responsible for the previously described translation of the horizontal movement of the leaf into the vertical movement of the slide, and a slide tail adjoining the slide body. In an exemplary embodiment, in the closed position, the slide body sealingly connects to the guide rail and the slide tail sealingly connects to the slide sealing means. The previously defined receptacle preferably extends completely through the guide in the sliding direction and has the slide rail described above on one of its face sides. On a further face side, in particular on one of the vertical sections described above, the guide preferably has a recess into which the slide tail preferably projects, preferably in the closed position and/or in the slide position.

In an exemplary embodiment, the slide, the rail, the slide sealing means, the guide and the guide sealing means are matched to one another in such a way that, in the closed position, a sealing contact, in particular a continuous sealing contact, is formed from the region between the slide and the rail via the region between the slide and the slide sealing means to the region between the guide and the guide sealing means. In particular, the sealing contact runs essentially in the horizontal direction in the area of the rail and the slide sealing means and in the vertical direction in the area of the guide sealing means.

As previously described, the parallel sliding system preferably has at least one rail which guides the leaf in the slide position and with which the slide is in sealing contact in the closed position in order to close the gap in the region of the rail in a sealing manner in the closed position. In an exemplary embodiment, the at least one slide and the at least one rail are matched to each other in such a way that the rail substantially prevents movement of the slide in the horizontal direction in which the leaf can be displaced between the closed position and the slide position. This can be ensured in particular by projections of the rail, which extends in particular in the vertical direction, blocking movement of the slide in the horizontal direction. Thereby, for example, the relative displaceability between the slide and the guide along a slide rail inclined with respect to the horizontal can be converted into a pure vertical movement of the slide and a pure horizontal movement of the guide, in particular together with the leaf.

In an exemplary embodiment, the at least one slide is arranged in the area of the inner vertical spar of the leaf profile. In an exemplary embodiment, the at least one slide is arranged in the region of a face side cover profile of the inner vertical spar, wherein the cover profile is attached to a supporting structure of the vertical spar. In particular, the guide is attached to the vertical spar, preferably as previously described.

In an exemplary embodiment, the guide is arranged in the vertical direction between the guide rail and the face side cover profile of the vertical spar. In an exemplary embodiment, the guide is vertically adjacent to an end of the cover profile facing the rail. In particular, the guide is designed to be aligned with the face side cover profile in such a way that an extension, in particular planar extension, of the face side cover profile is continued by the guide and is interrupted, in particular exclusively, by the previously described receptacle for the slide. Apart from the interruption by the receptacle for the slide, the guide preferably extends essentially as far as the horizontal spar opposing the guide, in particular as far as the previously described slide sealing means arranged in the notch region of the horizontal spar. By substantially it is to be understood in particular that, in particular in the closed position, a distance between the end of the receptacle facing the horizontal spar, in particular the slide sealing means arranged therein, is at most 20 mm, 15 mm, 10 mm, 5 mm, 3 mm or 1 mm from the horizontal spar, in particular the slide sealing means arranged therein. In an exemplary embodiment, the slide is formed complementary to the receiving means of the guide in such a way that the side of the slide extending parallel to the face side of the cover profile continues the planar extension of the cover profile and/or the guide in the area of the receiving means. In this context, by substantially is to be understood in particular an offset of at most 20 mm, 15 mm, 10 mm, 5 mm or 3 mm of the face side of the slide relative to the face side of the guide and/or of the cover profile.

According to a further aspect of the disclosure, which can be combined with the aspect of the disclosure described above and/or below and vice versa, the parallel sliding system comprises at least one rail (guide rail) guiding the leaf in the slide position, in particular an aluminum rail, and at least one sealing body which can preferably be designed as a slide according to the previously described aspect of the disclosure, which in the closed position sealingly closes a gap between the leaf and a horizontal spar of a frame profile surrounding the leaf in the closed position and in the slide position forms a line contact with the guide rail. It was recognized that noise generation, in particular whistling, squeaking, grazing noises, when the leaf is moved is particularly caused by a contact between the sealing body, in particular the slide, and the guide rail. Surprisingly, it was found that this noise development can be significantly reduced without significantly impairing the sealing function of the sealing body by designing the contact between the sealing body, in particular the slide, and the guide rail in the slide position as a line contact. The noise is reduced in particular by the fact that the contact area between the sealing body, in particular the slide, and the guide rail, which causes noise, is, compared to a planar contact, reduced by the line contact.

In an exemplary embodiment, in the slide position, the line contact is the only contact between the at least one sealing body and the at least one guide rail. It should be understood that, in particular as a result of small movements and manufacturing tolerances, the line contact between the sealing body and the guide rail can be interrupted at times, can become a planar contact at times, or further contacts between the guide rail and the sealing body can occur at times, especially during the displacement of the leaf in the slide position. In particular, however, in the non-moving state, there should be, preferably exclusively, a line contact between the at least one sealing body and the at least one guide rail in the slide position. In the embodiments described below and above with two sealing bodies, in particular slides, and two guide rails, a line contact, preferably exclusively a line contact, may be formed in the slide position in each case between a pair consisting of sealing body and guide rail. It should be understood that the line contact according to the disclosure need not be a perfect line contact in the sense of a line of infinitesimally small points. Rather, the line contact according to the disclosure may be understood to mean, in particular, a contact between two surfaces which, due to the shape and/or orientation of the surfaces relative to each other, extends exclusively along a line in which the two surfaces are tangent or intersect. For example, a line contact may be understood to mean a contact that occurs between two surfaces, at least one of which is inclined relative to the other, in particular between 1° and 7.5°, preferably between 1.5° and 5°, and/or at least one of which is curved. Alternatively, or additionally, a line contact may be to be understood as a contact between two surfaces which is at least 5 times, preferably at least 10 times, particularly preferably at least 20 times, as large in a longitudinal direction as in a width direction extending orthogonally to the longitudinal direction and preferably extends in the width direction by at most 5 mm, 3 mm, 2 mm, 1 mm or 0.5 mm.

In an exemplary embodiment, the sealing body and the guide rail engage with each other in the closed position via a groove and tongue system, wherein the line contact in the slide position is formed between a groove and a tongue of the groove and tongue system, in particular wherein the groove is formed in the sealing body and the tongue is formed in the guide rail. In an exemplary embodiment, the guide rail has a horizontally extending running section on which, in particular, rollers can roll between the leaf and the guide rail, from which the tongue extends in the vertical direction. In an exemplary embodiment, the tongue extends, in particular rod-shaped, as a projection in the vertical direction and/or in the horizontal direction, in particular sliding direction, parallel to the guide rail, in particular over the entire extension of the guide rail in the horizontal direction, in particular sliding direction. The groove may be formed as a recess extending in the vertical direction into the sealing body and/or extending parallel to the rail in the horizontal direction, in particular the sliding direction, in particular over the entire extension of the sealing body in the horizontal direction, in particular the sliding direction. In an exemplary embodiment, the groove and tongue are matched to each other in such a way that the groove is filled in the closed position by the tongue projecting in the vertical direction. This allows the tongue to be recessed into the groove in the closed position so that the sealing body can come into sealing contact with the guide rail. The inventors have found that the line contact in the slide position, in particular by means of the embodiments described below, can thereby be designed in such a way that the sealing contact in the closed position is not impaired.

In an exemplary embodiment, the line contact is provided by a relative inclination between at least one pair of walls comprising a groove wall and a tongue wall opposing the groove wall. In an exemplary embodiment, the groove wall and the tongue wall extend planarly and are inclined with respect to a vertical by at most 10°. In an exemplary embodiment, one wall selected from the groove wall and the tongue wall extends substantially vertically and the other wall selected from the groove wall and the tongue wall is inclined with respect to the vertical. For example, the groove wall may be inclined with respect to a vertical, wherein preferably the tongue wall extends vertically, or the tongue wall may be inclined with respect to a vertical, wherein preferably the groove wall extends vertically. In an exemplary embodiment, the inclination is between 0.5° and 10°, preferably between 1.0° and 7.5°, more preferably between 1.5° and 5°. In an exemplary embodiment, the inclination between the groove wall and the tongue wall is such that the groove wall and tongue wall converge in the vertical direction in the direction of the guide rail and/or spread in the vertical direction in the direction of the leaf. In an exemplary embodiment, the groove wall and the tongue wall extend in a V-shape relative to one another, wherein the V opens in the direction of the leaf. In an exemplary embodiment, the at least one groove wall and the at least one tongue wall are each formed by one of two opposing, in particular planar and/or vertically extending, side walls.

In an exemplary embodiment, the sealing body is a slide that is displaced relative to the leaf in the vertical direction when the leaf is moved horizontally from the slide position back into the closed position to sealingly close the at least one gap. In particular, the slide is as described in connection with the aspect of the disclosure relating thereto, more preferably as described in connection with one or more of the exemplary embodiments relating thereto. In addition, the parallel sliding system according to this embodiment comprises at least one guide fixedly connected to the leaf, which uses the horizontal movement of the leaf between the closed position and the slide position to displace the slide in the vertical direction, wherein the at least one guide comprises a receptacle for the slide, in which the slide is guided relative to the guide along a slide rail inclined relative to the horizontal. Further, in this embodiment, the inclination of the slide rail and the relative inclination between the at least one pair of walls are formed starting, from a vertical, in the same direction. The inventors have recognized that with such an alignment of the inclinations in the same direction, the noise development can be particularly reliably reduced and the ease of movement of the leaf during sliding in the slide position can be improved or at least maintained. Without being bound to an explanation, this may be related to the fact that as a result the relative inclination between the at least one pair of walls provides space for the slide in the direction in which it is pushed by the weight force due to the inclination of the slide guide, so that the risk of wedging or an increase in the contact area between the slide and guide rail is reduced. It has been found to be particularly preferable, in the case of a slide and a guide rail which are arranged, in the direction of gravity and with respect to the leaf, at the top to carry out the inclination of the slide rail and the relative inclination between the wall pair of slide and guide rail, starting from a horizontal, in the deposit direction, and/or in the case of a slide and a guide rail which are arranged, in the gravitational direction and with respect to the leaf, at the bottom, the inclination of the slide rail and the relative inclination between the pair of walls of the slide and the guide rail are carried out, starting from a horizontal, in the direction opposite to the deposit direction.

In an exemplary embodiment, the inclination between the groove wall and the tongue wall, especially in the previously described embodiment, is between 1.0° and 10°, preferably between 2.0° and 7.5°, particularly preferably between 3° and 5°, most preferably at 4°. The inventors have found that with such an inclination, in particular of 4°, on the one hand the smallest possible contact between the slide and the guide rail is provided in the slide position, thus reducing noise generation, and at the same time a sufficient form fit, in particular the smallest possible gap between the guide rail and the slide, is provided in the closed position to ensure tightness between the slide and the guide rail. In this context, the inventors have in particular recognized that an increase in the inclination beyond 4° leads to a larger gap between the slide and guide rail and thus to lower tightness, wherein a smaller inclination leads to an increase in noise. Thus, in an exemplary embodiment, an inclination of 4° may be used. However, a deviation of the inclination within the ranges described above has also still led to acceptable results, in terms of noise development and tightness.

In an exemplary embodiment of the previously described embodiment, a second relative inclination is formed between a second pair of walls comprising a second groove wall and a second tongue wall opposite the second groove wall, in particular wherein the second inclination is formed starting from a vertical preferably in the other direction as the inclination of the slide rail. In an exemplary embodiment, the second inclination starting from a vertical is formed in a different direction than the previously described (first inclination) between the previously described (first) pair of walls. In particular, the two relative inclinations are formed in such a way that they run towards each other, especially in the direction of gravity. In this embodiment, the second inclination may be between 0.5° and 7.5°, preferably between 1.0° and 5.0°, particularly preferably between 1.5° and 2.5°, most preferably at 2°. The inventors have found that with the second inclination, tolerances and movements of the leaf during sliding can be compensated for, so that noise development and the risk of wedging can be reduced more reliably. Similar to the first inclination, it has been found that a smaller inclination leads to a higher noise development and a higher risk of wedging, whereas a larger inclination leads to a lower tightness in the closed position.

In an exemplary embodiment, the groove is formed in the slide and that the (first) inclination, preferably the first and second inclination, is/are introduced in one of the, in particular in both, opposing side walls of the groove, where, in the case of a slide arranged, in the direction of gravity with respect to the leaf, at the top, the first inclination, in particular the 4° inclination, is formed at the second side wall, viewed in the deposit direction, and/or, in the case of a slide arranged, in the direction of gravity with respect to the leaf, at the bottom, the first inclination, in particular the 4° inclination, is formed at the second side wall, viewed in the deposit direction, and/or in the case of a slide arranged, in the direction of gravity with respect to the leaf, at the bottom, the first inclination, in particular the 4° inclination, is formed on the first side wall, as viewed in the deposit direction, wherein in particular the second inclination, in particular the 2° inclination, is formed on the correspondingly opposite side, as viewed in the deposit direction, of the, in particular respective, groove. In such an embodiment, the tongue may be formed in the guide rail, wherein at least in the case of the tongue wall forming the line contact, preferably in the case of all the tongue walls opposite one or both of the groove walls, no inclination is formed with respect to the vertical, in other words these are aligned vertically.

In an alternative embodiment, the groove may also be formed in the slide, but the (first) inclination, preferably the first and second inclination, may be formed in one of the, in particular in both, opposing side walls of the tongue formed in the guide rail, wherein, preferably in the case of a guide rail arranged, in the direction of gravity with respect to the leaf, at the top, the first inclination, in particular the 4° inclination, is formed on the second side wall as viewed in the deposit direction, and/or in the case of a guide rail arranged, in the direction of gravity with respect to the leaf, at the bottom, the first inclination, in particular the 4° inclination, is formed on the first side wall as viewed in the deposit direction, wherein in particular the second inclination, in particular the 2° inclination, is formed on the correspondingly opposite side, as viewed in the deposit direction, of the, in particular respective, tongue. In such an embodiment, preferably no inclination relative to the vertical is formed at least at the tongue wall forming the line contact, preferably at all tongue walls opposite the one or both tongue walls.

In an exemplary embodiment, the parallel sliding system has two slides which, when the leaf is moved horizontally from the slide position back into the closed position, are displaced relative to the leaf in the vertical direction in order to seal a gap between the leaf and the horizontal spar of a frame profile surrounding the leaf in the closed position. In an exemplary embodiment, the two slides are designed for this purpose as described above. In an exemplary embodiment, the parallel sliding system has a guide for each of the two slides that is firmly connected to the leaf and may be designed as described above. Furthermore, the parallel sliding system preferably comprises a guide sealing means and/or a slide sealing means for each of the two slides, which are preferably designed as described above. Furthermore, the parallel sliding system preferably comprises for each of the slides a rail guiding the leaf in the slide position, preferably as previously described.

In an exemplary embodiment, one, in particular both, of the two slides is arranged in the area of the inner vertical spar of the leaf frame, in particular as previously described. In particular, one of the two slides is arranged opposite a lower horizontal spar of the frame profile and the other slide is arranged opposite an upper horizontal spar of the frame profile. In an exemplary embodiment, the guides of the respective slide each connect in the vertical direction to the horizontal spars of the ends of the face side cover profile facing the frame profile, in particular as previously described. In an exemplary embodiment, the guides of the two slides are attached to ends of the inner horizontal spar of the leaf opposing each other in the vertical direction. In particular, the slides are movably mounted in the guides in such a way that, when the leaf is moved from the slide position to the closed position, they are moved in the vertical direction towards the horizontal spars of the frame profile. In an exemplary embodiment, the slide, the guide, the rail and the slide sealing means are matched to one another in such a way that, in the closed position, the face side of the inner vertical spar of the leaf, in particular of the cover profile, adjoins the horizontal spars of the frame profile in, the vertical direction, at the top and bottom in a sealing manner. Furthermore, the guide sealing means may be designed in relation to the guide, the inner vertical spar of the leaf and the inner vertical spar of the frame profile, in particular of the fixed pane, in such a way that, in the closed position, a sealing contact is provided between the two inner vertical spars, in particular over their entire vertical extension, in particular in the region of the face side cover profile.

According to another aspect of the disclosure, which can be combined with the aspects described above and vice versa, the parallel sliding system has two seals which surround the leaf in the closed position and are arranged in the region of a vertical spar of the leaf on a side of the leaf facing the opening. In an exemplary embodiment, the parallel sliding system has a vertical spar of a frame profile surrounding the leaf in the closed position, with which the two circumferential seals are in sealing contact in the area of the vertical spar of the leaf in the closed position. In particular, the two circumferential seals are in sealing contact with an outer side of the vertical spar of the leaf and an inner side of the vertical spar of the frame profile in the closed position. In particular, the circumferential seals in the area of the vertical spar of the leaf extend substantially along the complete vertical extension of the vertical spar. By substantially is meant in particular an extension of at least 70%, 80%, 90%, 95%, 98%, 99% or 100% of the vertical extension of the vertical spar of the leaf. Thanks to the arrangement of the two circumferential seals between the sides of the inner vertical spar of the leaf facing each other and the frame profile in accordance with the disclosure, in addition to the outer circumferential seal, a second, inner circumferential seal (inner seal) can be provided also in deposit-sliding-systems and in lift-sliding-systems. As a result, the advantages of parallel slide-tilt-systems and parallel deposit-slide-systems in terms of sealing and thermal insulation can also be achieved with lift-slide-systems and deposit-slide-systems.

In an exemplary embodiment, one of the two seals is an inner seal, which is attached in the area of the vertical spar to a face side cover profile of the, in particular inner, vertical spar. By the inner vertical spar is meant in particular the inner vertical spar of the leaf described above, which faces away from the opening in the open position. In an exemplary embodiment, the face side cover profile has a sealing side facing the vertical spar of the frame profile, on which the inner seal is arranged in the region of the vertical spar of the leaf. In an exemplary embodiment, the inner seal is in sealing contact with the sealing side of the face-side cover profile and the inner side of the vertical spar of the frame profile in the closed position.

In an exemplary embodiment, the vertical spar of the frame profile also comprises a face side cover profile with a sealing side facing the vertical spar of the leaf. In an exemplary embodiment, in the closed position, the inner seal is in sealing contact with the sealing side of the face side cover profile of the vertical spar of the frame profile and the outer side of the vertical spar of the leaf. In an exemplary embodiment, the outer seal in the area of the vertical spars of the leaf profile and frame profile extends in the vertical direction essentially over the entire extension of the vertical spar. The previously described region in which the circumferential seals extend in the region of the vertical spar of the leaf may also be referred to as the overlap region. In an exemplary embodiment, the two circumferential seals extend parallel to each other in the region of the vertical spar. In an exemplary embodiment, the two circumferential seals are spaced apart from one another in the overlap region in the sliding direction, in particular by at least 30%, 40%, 50%, 60%, 70% or 80% of the extension of one of the vertical spars in the sliding direction, in particular of the vertical spar with the greatest extension in the sliding direction.

In an exemplary embodiment, the face side cover profiles of the vertical spars described above are formed in two parts relative to a support structure of the vertical member. In an exemplary embodiment, the cover profiles are positively and/or non-positively connected, in particular by means of a clip connection, to the supporting structure of the respective vertical spars. In an exemplary embodiment, the sealing sides of the respective cover profile protrude with respect to the supporting structures in the deposit direction in the direction of the respective opposite vertical spar. In an exemplary embodiment, the vertical spars have receptacles for the respective seals or sealing sections.

In an exemplary embodiment, the inner seal is arranged in sections, in particular in the region of a second vertical spar, in particular the outer vertical spar, and two horizontal spars of the leaf, on the side of the leaf facing away from the opening. In an exemplary embodiment, the inner seal in the closed position on the side of the opening facing away from the opening extends along the horizontal spars of the leaf and along the second, in particular outer, vertical spar. In an exemplary embodiment, the side of the leaf facing away from the opening has a frame which, in the closed position, is formed to overlap with the horizontal spar and an inner vertical spar of the frame profile. In an exemplary embodiment, the overlapping area extends along the horizontal spars and along one, preferably the outer, vertical spar of the leaf. In an exemplary embodiment, in the closed position, the inner seal is in sealing contact with both the horizontal spar and the outer vertical spar of the leaf and of the frame profile, in particular in the overlap area. In an exemplary embodiment, the inner seal in the area of the horizontal spars is in sealing contact both with the horizontal spars of the frame profile and with the guide rails attached to them.

In an exemplary embodiment, the inner seal runs in sections on the inner side and in sections on the outer side of the leaf, in particular in the area of the horizontal spars on the inner side of the leaf and/or in the area of the inner vertical spar on the outer side of the leaf and in the area of the outer vertical spar on the inner side of the leaf.

In an exemplary embodiment, the sections of the inner seal arranged on the side of the leaf facing the opening and the sections of the inner seal arranged on the side of the leaf facing away from the opening are connected to one another via bridging sections to form the circumferential seal. In an exemplary embodiment, the bridging sections are provided via the inventive slide described above. In particular, the bridging sections are preferably arranged in the region of the inner vertical spar, in particular in the vertical direction between the inner vertical spar of the leaf and sections of the horizontal spars of the frame profile opposite the inner vertical spar of the leaf. In an exemplary embodiment, the bridging section has a partial section which, in the closed position, is formed by a sealing contact between the previously described slide and a guide. Furthermore, the bridging section preferably has a partial section which, in the closed position, is formed by a sealing contact between the slide, in particular the tail of the slide, and a slide sealing means. Furthermore, the bridging section preferably has a partial section which, in the closed position, is formed by a sealing contact between a guide, in particular the guide described above, and a guide sealing means. In an exemplary embodiment, the inner seal in the bridging section between the horizontal spars of the leaf and the frame profile merges into the partial section between the slide and the guide in the closed position. Furthermore, the sealing contact preferably merges from the partial section between the slide and the guide into the sealing contact between the slide and the slide sealing means. Furthermore, the sealing contact preferably merges from the partial section between the slide and the slide sealing means into the partial section between the guide and the guide sealing means. Finally, the partial section between guide and guide sealing means preferably merges into the area of the seal arranged on the side of the leaf facing the opening on a vertical spar, in particular the inner vertical spar.

The bridging section described above has made it possible to provide a circumferential seal arranged on the inner side of the leaf in the area of the horizontal spars and the outer vertical spar, and arranged on the outer side in the area of the inner vertical spar, in order to be able to use the vertical spar of the frame profile opposite the inner vertical spar of the leaf to make sealing contact with the leaf in this area. Thereby, the bridging sections between the inner area and the outer area of the inner seal prevent the seal from being interrupted.

The vertical spars described above, in particular supporting structure of the vertical spars, are preferably made of a plastic, in particular PVC. The guide and/or the slide are preferably made of polymers, in particular acrylonitrile-styrene-acrylate copolymers.

The seal, in particular the circumferential seals, the slide sealing means and the guide sealing means are preferably formed from a material having a compression hardness between 5 and 1,000 kPa, preferably between 10 and 800 kPa, particularly preferably between 20 and 550 kPa. In an exemplary embodiment, the sealing means are formed of an elastic material, in particular a more elastic material than the spars of the leaf and the frame, particularly preferably of a cellular rubber.

In the following description of exemplary embodiments, a parallel sliding system according to the disclosure is generally designated by the reference sign 1.

FIG. 1 shows a front view of a parallel sliding system 1 according to the disclosure. The parallel sliding system 1 has a leaf 3 and a fixed glazing 5. The leaf 3 is a window leaf. The leaf 3 is shown in a closed position in which the leaf 3 closes an opening located in the drawing plane behind the leaf 3, in this case in the form of a window opening. The leaf 3 has a handle 7 which can be operated to move the leaf 3 horizontally into a slide position (FIGS. 2*c* and 3*c*), in which the leaf 3 can be moved in the sliding direction S parallel to the opening and the fixed glazing 5 into an open position (not shown) to expose the opening. The leaf 3 has a pane 9. The pane 9 is surrounded by a leaf profile 11. The leaf profile 11 has, 13 in the direction of gravity G, a lower horizontal spar and an upper horizontal spar 15. Furthermore, the leaf 3 has two vertical spars 17, 19, namely an inner vertical spar 17 facing away from the opening in the open position and an outer vertical spar 19 facing the opening in the open position. Further, the fixed glazing 5 has a pane 21 and a fixed glazing profile 23 surrounding the pane. The fixed glazing profile 23 has a lower horizontal spar 25 in the direction of gravity G and an upper horizontal spar 27 in the direction of gravity G. Furthermore, the fixed glazing profile 23 has an outer vertical spar 31 facing away from the opening and an inner vertical spar 29 (not shown in FIG. 1, cf. FIG. 4) facing the opening. Furthermore, the parallel sliding system 1 has a frame profile 33 which, in the closed position, surrounds the leaf 3. The frame profile 33 has an outer vertical spar 35. Furthermore, the frame profile 33 has, in the gravitational direction G, a lower horizontal spar 25, which in the present case simultaneously functions as a lower horizontal spar 25 of the fixed glazing profile 23, and, in the gravitational direction G, an upper horizontal spar 27, which in the present case simultaneously functions as an upper horizontal spar 27 of the fixed glazing profile 23. Furthermore, the frame profile 33 has an inner vertical spar 29 (not shown in FIG. 1, cf. FIG. 4), which in the present case also functions as the inner vertical spar 29 of the fixed glazing profile 23. The leaf 3 and its pane 9 have a main extension plane which is spanned by the gravitational direction G and the sliding direction S. The fixed glazing 5 and its pane 21 also have a main extension plane spanned by the gravitational direction G and the sliding direction S.

FIG. 4 shows a sectional view along the line IV-IV from FIG. 1. Therein, only the connecting pieces of the panes 9 and 21 are indicated. The outer vertical spars 19, 31 and 35 are not shown. The main extension plane 37 of the leaf 3 and the main extension plane 39 of the fixed glazing 5 are indicated by dashed lines. As can be seen from FIG. 4, the main extension planes 37 and 39 are spaced apart in the deposit direction A described in detail below. In particular, the inner vertical spar 17 of the leaf 3 and the inner vertical spar 29 of the fixed glazing 5 or frame profile 33 are arranged one behind the other in the deposit direction A. The vertical spars 17 and 29 each have a supporting structure 41, 43 and a cover profile 45, 47 attached to the supporting structure 41, 43.

The cover profiles 45, 47 are each connected to the supporting structure 41, 43 via clip connections 49. The cover profiles serve in particular as a screen and protection for mechanisms of the parallel sliding system 1 attached to the supporting structures 41, 43. The cover profiles 45, 47 define a face side of the vertical spars 17, 29. The interior of a building is indicated by IR in FIG. 4. The parallel sliding system 1 seals the interior IR of the building from the exterior AR (environment). The outer sides of the vertical spars 17, 29 facing the exterior AR are marked with reference signs 51 and 53. The inner sides of the vertical spars 17 and 29 facing the inner space IR are identified by the reference signs 55 and 57. In FIG. 4, the outer side 51 of the inner vertical spar 17 of the leaf 3 and the inner side 57 of the vertical spar 29 of the fixed glazing 5 and the frame profile 33, respectively, face each other in the deposit direction A. The two, according to one aspect of the disclosure, circumferential seals in the closed position, are shown in FIG. 4 with reference numerals 59, 61. The seal provided with reference numeral 59 is the inner seal which seals the parallel sliding system 1 with respect to the interior IR. The seal provided with reference numeral 61 is the outer seal that seals the parallel sliding system 1 with respect to the exterior AR. As can be seen from FIG. 4, both the inner seal 59 and the outer seal 61 are arranged in the region of the vertical spar 17 of the leaf 3 on the side of the leaf 3 facing the opening, namely the outer side 51.

FIGS. 11*a* and 11*b* show the embodiment of the area A in FIG. 1 of parallel sliding systems as known in the prior art. FIGS. 12*a* and 12*b* correspondingly show the area B marked in FIG. 1 as implemented in parallel sliding systems known in the prior art.

In order to enable the leaf 3 to be moved from the illustrated closed positions in the deposit direction A into slide positions, jogs 63, predominantly staircase-shaped jogs 63, are provided at the upper and lower ends of the cover profile 45 in the gravitational direction G. These jogs 63 allow the leaf 3 to be moved into the slide position without colliding with the guide rails 67. However, one disadvantage of the jogs 63 is that, in particular due to the pure deposit movement A in the deposit direction (i.e. due to a lack of deposit movement in the vertical direction), closing of the gap 69, 71 between the cover profile 45 and the respective rail 65, 67 is not possible. As a result, the inner seal 59 is interrupted in known systems at least in the area of the jog 63, whereby the atmosphere of the interior IR is always connected to the notch region between the leaf 3 and the frame profile 33 via the jog 63 and is thereby also connected to the exterior AR in embodiments with drainage and ventilation implemented via the notch region.

To illustrate how the notch region 73 described above and below can be formed, reference is made to FIG. 13, which shows a notch region 73 between a lower horizontal spar 13 of a leaf 3 and a lower horizontal spar 2 of a frame section 33. An inner seal 59 seals the notch region 73 from the interior IR, so that the notch region 73 can be used for ventilation and drainage.

FIG. 2*a* shows a perspective view of the area A shown in FIG. 1 and FIG. 3*a* a perspective view of the area B shown in FIG. 1 of a parallel slide system 1 according to the disclosure in the form of a deposit slide system 1. In each case, a slide 75, 77 is provided therein which, when the leaf 3 is moved horizontally in the deposit direction A from the slide position (FIG. 2*c* and FIG. 3*c*) back into the closed position (FIG. 2*b* and FIG. 3*b*), is displaced relative to the leaf in the vertical direction V in order to close a respective gap 79, 81 between the leaf 3 and the respective horizontal spar 13, 15 in a sealing manner. For this purpose, a guide 83, 85 is provided in each case, which is firmly connected to the leaf 3 and uses the horizontal movement, in particular in deposit direction A, of the leaf 3 to displace the slides 75, 77 in vertical direction V. Thereby, the respective slide 75, 77 and the respective guide 83, 85 perform a horizontal movement and a vertical movement relative to each other in response to a movement of the leaf 3 between the closed position and the slide position, wherein the respective slide 75, 77 moves exclusively in the vertical direction V and the guide moves exclusively, in particular together with the leaf 3, in the deposit direction A.

In particular, the respective guide 83, 85 has a respective receptacle 87, 89 for the respective slide 75, 77, in which the slide 75, 77 is guided relative to the respective guide 83, 85 along a respective slide rail 91, 93 which is inclined relative to the horizontal. The respective slide rail 91, 93 has a T-groove over which a respective T-shaped projection 94, 95 is guided along the respective slide rail 91, 93. The slides 75, 77 preferably each have a slide body 97, 99 which, in the closed position, is in sealing contact with the respective guide rail 105, 107 described below. For this purpose, the slide body 97, 99 each has two recesses 109, 111, 113, 115 which, in the closed position, are filled by projections 117, 119, 121, 123 of the respective guide rail 105, 107 projecting in the vertical direction. This allows the respective projections 117, 119, 121, 123 to be recessed in the corresponding recesses 109, 111, 113, 115 in the closed position so that the respective slide 75, 77 can come into sealing contact with the respective rail 105, 107.

Furthermore, each of the slides 75, 77 has a respective slide sealing means section 101, 103, which can also be referred to as a slide tail, via which the respective slide 75, 77 is in sealing contact with a respective slide sealing means 125, 127 arranged in the corresponding horizontal spar 25, 27 in the closed position. As a result, in particular in the closed position, a continuous sealing contact can be provided via the respective slide 75, 77 with the respective rail 105, 107 and the slide sealing means 125, 127 connected thereto, in particular over the complete extension of the respective horizontal spar in the deposit direction A. Furthermore, a respective guide sealing means 129, 131 is provided on each of the guides 83, 85, via which the respective guide 83, 85 is in sealing contact with the inner vertical member 29 of the frame profile 33 or of the fixed glazing profile 23 in the closed position. For receiving the respective guide sealing means 129, 131, the respective guide 83, 85 can have a guide sealing means receptacle 133, 135. Complementary to the respective guide sealing means receptacle 133, 135, the respective guide sealing means 129, 131 may have a transition section 137, 139. In the example of guide sealing means 129, 131 shown in FIG. 9, the transition section 137, 139 is L-shaped and adjoins an I-shaped main sealing section 141, 143.

By the previously described design of the projections 117, 119, 121, 123 of the guide rails 105, 107, it can be ensured in particular that the respective guide rail 105, 107 avoids a movement of the respective slide 75, 77 in the horizontal direction, in particular deposit direction A, in which the leaf 3 can be displaced between the closed position and the slide position. As can be seen in particular from FIGS. 2*b*, 2*c*, 3*b* and 3*c*, the respective slide 75, 77 and its guide 83, 85 are mounted in the region of the face side cover profile 45 of the inner vertical spar 17 of the leaf 3. In this case, the respective slide 75, 77 and the respective guide 83, 85 are matched to one another in such a way that, when the leaf is moved from the slide position into the closed position, the two slides 75, 77 are each moved in the vertical direction V away from the leaf 3, in particular from the cover profile 45, in the direction of the guide rail 105, 107 guiding the leaf 3 in the slide position, in particular until the respective slides 75, 77 are in sealing contact with the respective guide rail 105, 107 and the respective sealing means 125, 127. At the same time, the movement opposite to the deposit direction A establishes a sealing contact between the respective guides 83, 85 and their guide sealing means 129, 131 with the inner vertical spar 29 of the frame profile 33 or the fixed glazing profile 23.

As previously described, FIG. 4 illustrates the aspect according to the disclosure, according to which at least two seals 59, 61 circulating in the closed position are arranged in the area of the vertical spar 17 of the leaf 3 on a side of the leaf 3 facing the opening. In FIGS. 2*b* and 2*c* and FIGS. 3*b* and 3*c*, it is indicated how the circumferential inner seal 59 extends in the region of the horizontal spars 13, 15 of the leaf 3, namely between the inner side 55 of the leaf 3 and the inner side of the respective horizontal spar 25, 27.

In order to connect the inner and outer portions of the inner seal 59 to form a circumferential seal, the previously described slides 75, 77 are used to provide a bridging portion of the seal along the lower horizontal spar 25 and the upper horizontal spar 27 of the fixed glazing frame 23 and the frame profile 33, respectively.

FIG. 14 shows a side view of the portion of the deposit slide system shown in FIG. 3*a* with the leaf in the closed position. FIG. 14 differs from FIG. 3*b* only in that a slide 77' with modified recess 111', hereinafter referred to as groove 111', is used. The groove 111' has two groove walls 145, 147 opposite each other. The groove wall 145 is inclined by 4° relative to a vertical. Here, the inclination of the groove wall 145 is formed starting from a vertical in the same direction as the inclination of the slide rail 93 of the guide 85. The groove wall 147 is inclined by 2° with respect to a vertical. The projection 121 of the guide rail 107, shown in FIG. 14, is hereinafter referred to as the tongue 121, since the projection/the tongue engages in the groove 111' according to a tongue-and-groove system in the illustrated closed state. The tongue 121 has two opposing tongue walls 149, 151. The tongue walls 149, 151 extend in the vertical direction.

The left tongue wall 149 and the left groove wall 145 form a pair of walls, between which a relative inclination of 4° is provided by the inclination of the groove wall 145 with respect to the vertical by 4° and the vertical extension of the tongue wall 149. The inventors have found that this provides a line contact between the slide 77' and the guide rail 107 in the slide position, thereby reducing noise, and at the same time provides a sufficient form fit, in particular gap between guide rail 107 and slide 77' being as small as possible, in the closed position to ensure tightness between the slide 77' and the guide rail 107.

The right tongue wall 151 and the right groove wall 147 form a pair of walls between which a relative inclination of 2° is provided by the inclination of the groove wall 147 with respect to the vertical by 2° and the vertical extension of the tongue wall 151. The inventors have found that this provides, on the one hand, a line contact between the slide 77' and the guide rail 107 in the slide position, thereby reducing noise, and at the same time provides a sufficient form fit, in particular gap between guide rail 107 and slide 77' being as small as possible, in the closed position to ensure tightness between the slide 77' and the guide rail 107. The inventors have found that this inclination can be used to compensate for tolerances and movements of the leaf during sliding, so that noise development and the risk of wedging can be reliably reduced. Similar to the 4° inclination described above, it has been found that a smaller inclination leads to higher noise development and a higher risk of wedging, whereas a larger inclination leads to lower tightness in the closed position.

FIG. 15 shows a modified guide rail 105' for use in the area of the lower horizontal spar of the frame profile according to the section A marked in FIG. 1. The guide rail 105' is designed to be used as an alternative to the guide rail 105 shown in FIG. 2*c* in the area of the lower horizontal spar. For a better overview, FIG. 2*c* is shown again on the same side as FIG. 15. The guide rail 105' differs from the guide rail 105 in particular by a modified projection 117'. The projection 117' and the recess 109 engage in one another in the closed position in accordance with a tongue-and-groove system, so that hereinafter the projection 117' is referred to as the tongue and the recess 109 as the groove. The tongue 117' has two opposing tongue walls 153, 155. The tongue wall 153 is inclined by 4° relative to a vertical. The inclination of the tongue wall 153, starting from a vertical line, is in the same direction as the inclination of the slide rail 91 of the guide 83. The tongue wall 155 extends in the vertical direction. The groove 109 shown in FIG. 2*c* has two groove walls 157, 159 opposite to each other. The groove walls 157, 159 extend in the vertical direction.

The right tongue wall 153 and the right groove wall 157 form a pair of walls between which a relative inclination of 4° is provided by the inclination of the tongue wall 153 with respect to the vertical by 4° and the vertical extension of the groove wall 157. The inventors have found that this provides a line contact between the slide 75 and the guide rail 105' in the slide position, thereby reducing noise, and at the same time provides a sufficient form fit, in particular the gap between the guide rail 105' and the slide 75 being as small as possible, in the closed position to ensure tightness between the slide 75 and the guide rail 105'.

The features disclosed in the foregoing description, the figures and the claims may be of importance both individually and in any combination for the realization of the disclosure in various embodiments or aspects.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms “first”, “second”, etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms “comprise” and “have” and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST

1 Parallel sliding system
3 Leaf
5 Fixed glazing
7 Handle
9, 21 Pane
11 Leaf profile
13, 25 Lower horizontal spar
15, 27 Upper horizontal spar
17, 29 Inner vertical spar
19, 31, 35 Outer vertical spar
23 Fixed glazing profile
33 Frame profile
37, 39 Main extension plane
41, 43 Support structure
47 Cover profile
49 Clip connection
51, 53 Outer side
55, 57 Inner side
59 Inner seal
61 Outer seal
63 Notching
67, 105, 105', 107 Guide rails
69, 71 Gap
73 Notch region
77, 77' Slide
79, 81 Gap
83, 85 Guide
87, 89 Mounting
91, 93 Slide rail
94, 95 T-shaped projection
97, 99 Slide body
101, 103 Slide seal section
109, 111, 111', 113, 115 Recess/groove
117, 117' 119, 121, 123 Projection/tongue
125, 127 Sealing means
129, 131 Guide sealing means
133, 135 Guide sealing means receptacle/groove
137, 139 Transition section
141, 143 I-shaped main sealing section
145, 147, 157, 159 Groove wall
149, 151, 153, 155 Tongue wall
A Deposit direction
G Gravity direction
S Sliding direction
V Vertical direction

The invention claimed is:

1. A parallel sliding system, comprising:

a leaf configured to be displaced horizontally from a closed position, in which the leaf closes an opening, into a sliding position, in which the leaf is configured to slide parallel to the opening into an open position exposing the opening, at least one slide which, when the leaf is displaced horizontally from the sliding position back into the closed position, is configured to be displaced relative to the leaf in a vertical direction in order to sealingly close at least one gap between the leaf and a horizontal spar of a frame profile which surrounds a corresponding portion of the leaf in the closed position, at least one guide fixedly connected to the leaf, and configured to use the horizontal movement of the leaf between the closed position and the sliding position to displace the at least one slide in the vertical direction, and wherein the at least one guide has a receptacle for the at least one slide, in which the at least one slide is guided relative to the at least one guide along a slide rail inclined relative to a horizontal and positioned vertically above or below the at least one slide, wherein the at least one slide is guided in the slide rail.

2. The parallel sliding system according to claim 1, further comprising at least one guide seal, which is arranged in the closed position, in which the leaf closes the opening, between the at least one guide and a vertical spar of the frame profile and sealingly connects to the vertical spar of the frame profile.

3. The parallel sliding system according to claim 1, further comprising at least one rail configured to guide the leaf in the sliding position, in which the leaf is configured to slide parallel to the opening into the open position exposing the opening, the at least one slide being in sealing contact with the at least one rail, when the leaf is in the closed position, to sealingly close the at least one gap in a region of the at least one rail.

4. The parallel sliding system according to claim 1, further comprising at least one slide seal arranged in a notch region of the horizontal spar, the at least one slide being in sealing contact with the at least one slide seal, when the leaf is in the closed position, to sealingly close the at least one gap in a region of the horizontal spar.

5. The parallel sliding system according to claim 1, wherein:

the leaf comprises a leaf profile which surrounds a pane of the leaf, the leaf profile including:

the horizontal spar, an outer vertical spar which faces the opening when the leaf is in the open position exposing the opening, and an inner vertical spar which faces away from the opening when the leaf is in the open position, the at least one slide is arranged in a region of the inner vertical spar of the leaf profile, the at least one slide is arranged in a region of an end-face cover profile of the inner vertical spar, and the at least one guide is attached to the inner vertical spar of the leaf profile.

6. The parallel sliding system according to claim 1, further comprising at least one rail including projections, which extend in the vertical direction, blocking movement of the at least one slide in horizontal directions in which the leaf can be displaced between the closed position, in which the leaf closes the opening, and the sliding position, in which the leaf is configured to slide parallel to the opening into the open position exposing the opening.

7. The parallel sliding system according to claim 1, wherein the at least one slide and the at least one guide are adapted to each other such that the at least one slide is moved in the vertical direction towards the leaf when the leaf is moved from the closed position to the sliding position, and the at least one slide is displaced towards the horizontal spar of the frame profile when moving the leaf from the sliding position back to the closed position.

8. The parallel sliding system according to claim 1, wherein the at least one guide and the at least one slide are configured to perform a horizontal movement and a vertical movement relative to each other in response to a movement of the leaf between the closed position, in which the leaf closes the opening, and the sliding position, in which the leaf is configured to slide parallel to the opening into the open position exposing the opening, the at least one slide moving exclusively in the vertical direction and the at least one guide moving exclusively in a horizontal direction.

9. The parallel sliding system according to claim 8, wherein the at least one slide is guided via a dovetail or T-groove connection.

10. A parallel sliding system, comprising:

a leaf configured to be displaced horizontally from a closed position, in which the leaf closes an opening, into a sliding position, in which the leaf is configured to slide parallel to the opening into an open position exposing the opening, at least one rail configured to guide the leaf in the sliding position, at least one sealing body, which when the leaf is moved horizontally from the sliding position to the closed position, is configured to be displaced relative to the leaf in a vertical direction to sealingly close a gap between the leaf and a horizontal spar of a frame profile which surrounds a corresponding portion of the leaf in the closed position, and the at least one sealing body forms, when the leaf is in the sliding position, a line contact with the at least one rail, at least one guide fixedly connected to the leaf, and configured to use the horizontal movement of the leaf between the closed position and the sliding position to displace the at least one sealing body in the vertical direction, and wherein the at least one guide has a receptacle for the at least one sealing body, in which the at least one sealing body is guided relative to the at least one guide along a slide rail inclined relative to a horizontal and positioned vertically above or below the at least one sealing body, wherein the at least one sealing body is guided in the slide rail.

11. The parallel sliding system according to claim 10, wherein the at least one sealing body and the at least one rail are configured to engage one another via a tongue-and-groove system, the line contact being formed between a groove and a tongue of the tongue-and-groove system, and wherein the groove is formed in the at least one sealing body and the tongue is formed on the at least one rail.

12. The parallel sliding system according to claim 11, wherein:

the line contact is provided by a relative inclination between at least one pair of walls including a groove wall and a tongue wall opposite the groove wall; and the groove wall is vertically inclined with respect to the tongue wall, or the tongue wall is vertically inclined with respect to the groove wall.

13. The parallel sliding system according to claim 12, wherein:

the at least one sealing body is a slide which, when the leaf is displaced horizontally from the sliding position back into the closed position, is displaced relative to the leaf in the vertical direction to sealingly close the gap, and the inclination of the slide rail and the relative inclination between the at least one pair of walls are inclined in a first direction relative the vertical direction.

14. The parallel sliding system according to claim 13, wherein a second relative inclination is formed between a second pair of walls, including a second groove wall and a second tongue wall opposite the second groove wall, the second relative inclination being inclined in a second direction opposite the first direction relative to the vertical direction.

15. The parallel sliding system according to claim 10, wherein the at least one sealing body comprises: two slides which are displaced in the vertical direction relative to the leaf when the leaf is moved horizontally from the sliding position back into the closed position, one of the two slides being arranged adjacent the horizontal spar of the frame profile and the other of the two slides being arranged adjacent a second horizontal spar of the frame profile.

16. A parallel sliding system, comprising:

a leaf configured to be displaced horizontally from a closed position, in which the leaf closes an opening, into a sliding position, in which the leaf is configured to slide parallel to the opening into an open position exposing the opening;

at least one slide which, when the leaf is displaced horizontally from the sliding position back into the closed position, is configured to be displaced relative to the leaf in a vertical direction in order to sealingly close at least one gap between the leaf and a horizontal spar of a frame profile which surrounds a corresponding portion of the leaf in the closed position;

at least one guide fixedly connected to the leaf, and configured to use the horizontal movement of the leaf between the closed position and the sliding position to displace the at least one slide in the vertical direction, wherein the at least one guide includes a receptacle for the at least one slide, in which the at least one slide is guided relative to the at least one guide along a slide rail inclined relative to a horizontal, the at least one slide being guided in the slide rail; and at least one rail configured to guide the leaf in the sliding position, the at least one slide forming, when the leaf is in the sliding position, a line contact with the at least one rail, wherein the at least one slide and the at least one rail are configured to engage with one another when the leaf is in the closed position via a tongue-and-groove system including a groove formed in the at least one slide and a tongue formed on the at least one rail, the line contact is provided by a relative inclination between at least one pair of walls including a groove wall and a tongue wall opposite the groove wall, and the groove wall is vertically inclined with respect to the tongue wall or the tongue wall is vertically inclined with respect to the groove wall.

17. The parallel sliding system according to claim 16, wherein an inclination of the slide rail and the relative inclination between the at least one pair of walls are inclined in a first direction relative the vertical direction.

18. The parallel sliding system according to claim 17, wherein a second relative inclination is formed between a second pair of walls, including a second groove wall and a second tongue wall opposite the second groove wall, the second inclination being inclined in a second direction opposite the first direction relative to the vertical direction.

* * * * *